(12) United States Patent
Xie et al.

(10) Patent No.: US 9,882,502 B2
(45) Date of Patent: Jan. 30, 2018

(54) PRE-CHARGE CONTROL METHOD

(71) Applicant: DELTA ELECTRONICS (SHANGHAI) CO., LTD., Shanghai (CN)

(72) Inventors: Wei Xie, Shanghai (CN); Jianfei Zheng, Shanghai (CN); Dingkun Shen, Shanghai (CN); Lan Wei, Shanghai (CN); Jianping Ying, Shanghai (CN); Zhiming Hu, Shanghai (CN); Wei Xu, Shanghai (CN); Wei Tian, Shanghai (CN)

(73) Assignee: Delta Electronics (Shanghai) Co., LTD., Shanghai (CN)

( * ) Notice: Subject to any disclaimer, the term of this patent is extended or adjusted under 35 U.S.C. 154(b) by 0 days.

(21) Appl. No.: 15/399,598

(22) Filed: Jan. 5, 2017

(65) Prior Publication Data
US 2017/0294847 A1 Oct. 12, 2017

(30) Foreign Application Priority Data

Apr. 8, 2016 (CN) .......................... 2016 1 0216450

(51) Int. Cl.
*H02M 7/48* (2007.01)
*H02M 5/293* (2006.01)
*H02M 1/32* (2007.01)
*H02M 1/088* (2006.01)

(52) U.S. Cl.
CPC ........... *H02M 5/293* (2013.01); *H02M 1/088* (2013.01); *H02M 1/32* (2013.01); *H02M 2005/2932* (2013.01)

(58) Field of Classification Search
CPC .......... H02M 1/42; H02M 7/49; H02M 7/483
USPC ....... 363/16–17, 37, 39, 40, 43, 66, 137, 71, 363/132
See application file for complete search history.

(56) References Cited

U.S. PATENT DOCUMENTS

| | | | | |
|---|---|---|---|---|
| 3,529,210 A | * | 9/1970 | Wada ....................... | H01H 9/42 361/3 |
| 5,083,039 A | * | 1/1992 | Richardson ........... | F03D 7/0272 290/44 |
| 6,009,002 A | * | 12/1999 | Steimer ............... | H02M 5/4585 363/34 |

(Continued)

*Primary Examiner* — Rajnikant Patel
(74) *Attorney, Agent, or Firm* — Kirton McConkie; Evan R. Witt

(57) ABSTRACT

A pre-charge control method for a hybrid multilevel power converter comprises steps of: (a) controlling access of the current-limiting resistor unit, limiting current from the AC power via the current-limiting resistor unit, and outputting the current; (b) controlling the second capacitor unit to bypass, and charging the first capacitor unit; (c) controlling the access of the second capacitor unit when the first capacitor unit is charged to a third preset voltage, and charging the first and second capacitor units at the same time; (d) controlling the first capacitor unit to bypass when the second capacitor unit is charged to a fourth preset voltage, or the first capacitor unit is charged to a first preset voltage, and charging the second capacitor unit; and (e) controlling the access of the first capacitor units and the current-limiting resistor unit to bypass when the second capacitor unit is charged to a second preset voltage.

26 Claims, 26 Drawing Sheets

(56) References Cited

U.S. PATENT DOCUMENTS

| | | | | |
|---|---|---|---|---|
| 8,207,712 B2* | 6/2012 | Hasler | ................... | H02J 3/1842 323/208 |
| 8,730,696 B2* | 5/2014 | Barbosa | ................ | H02M 7/483 363/132 |

* cited by examiner

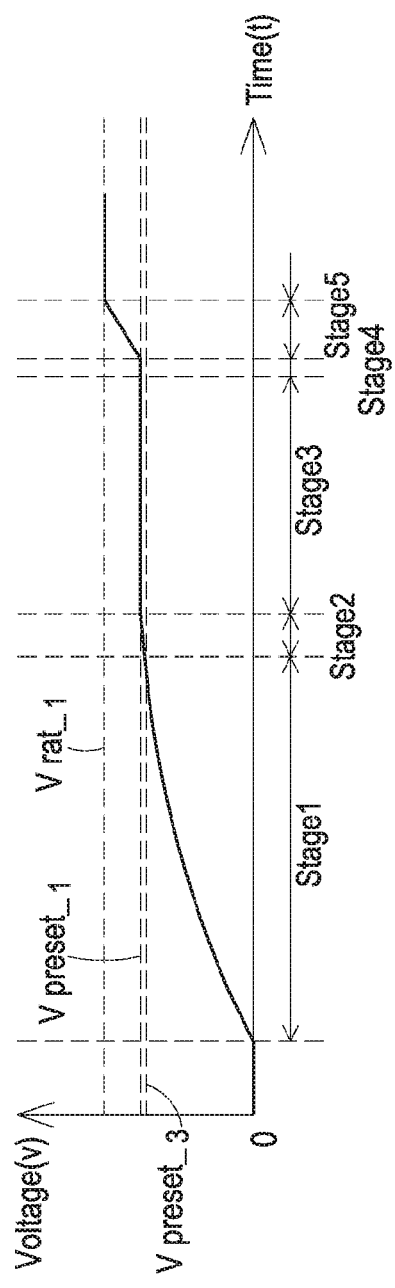
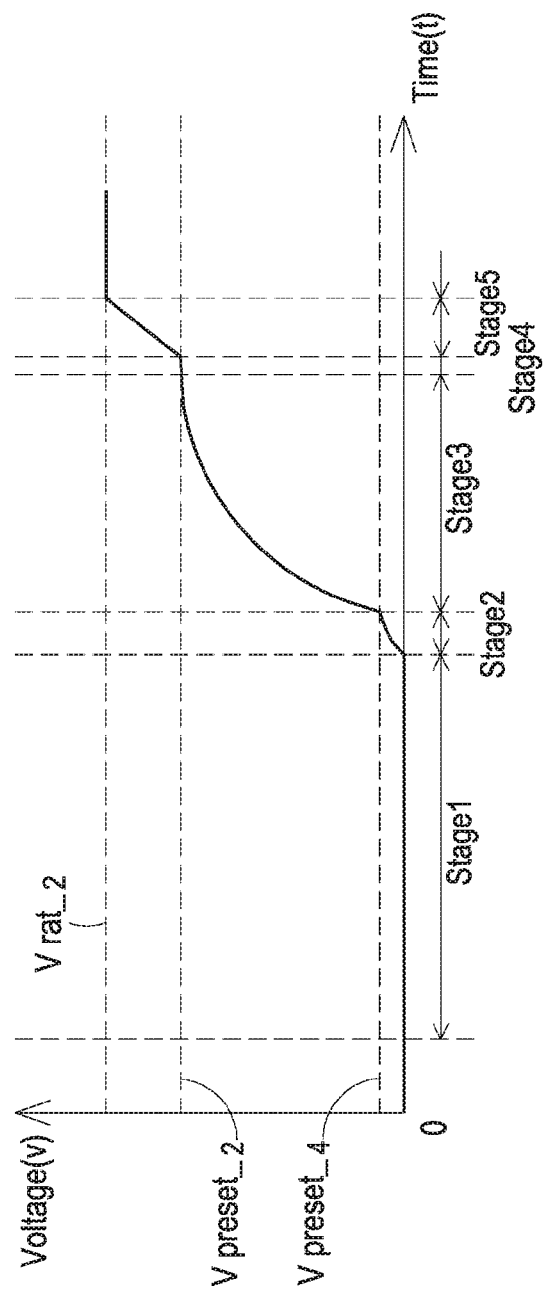
FIG. 8A
FIG. 8B

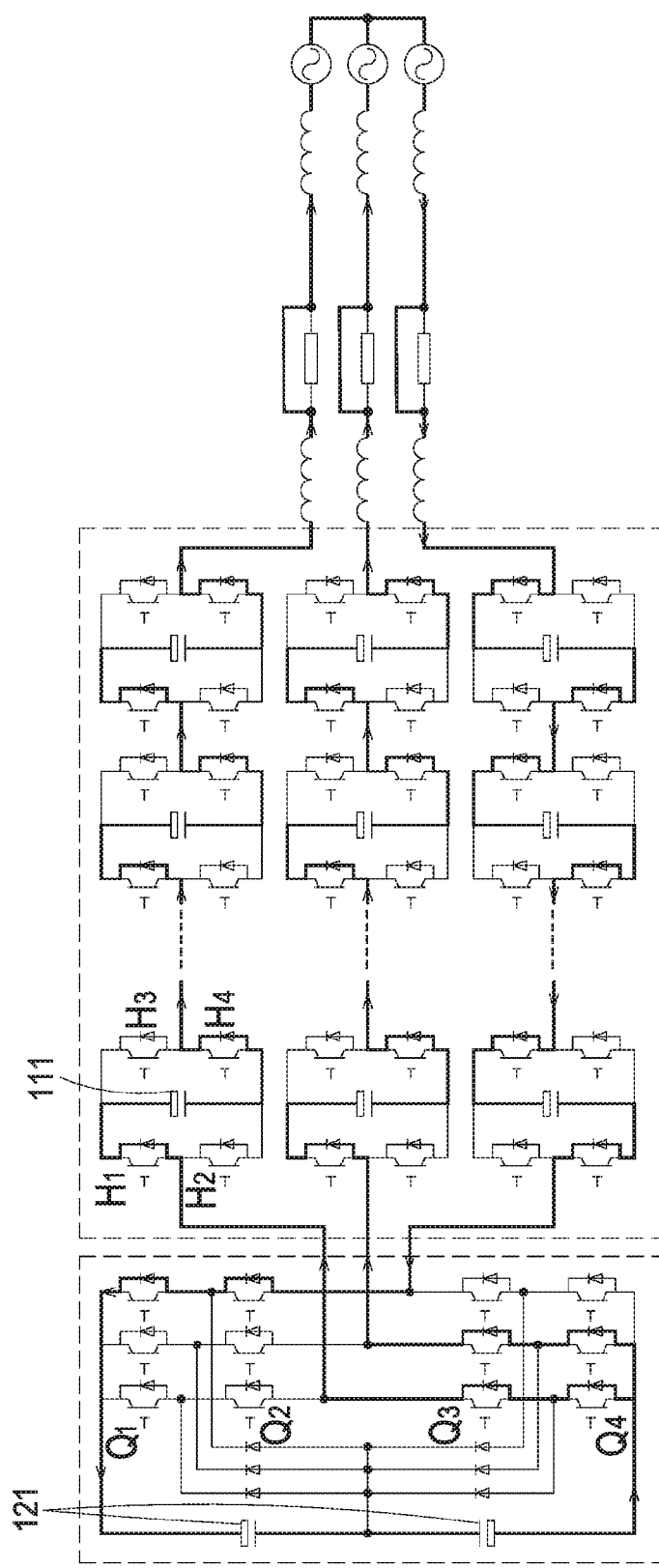

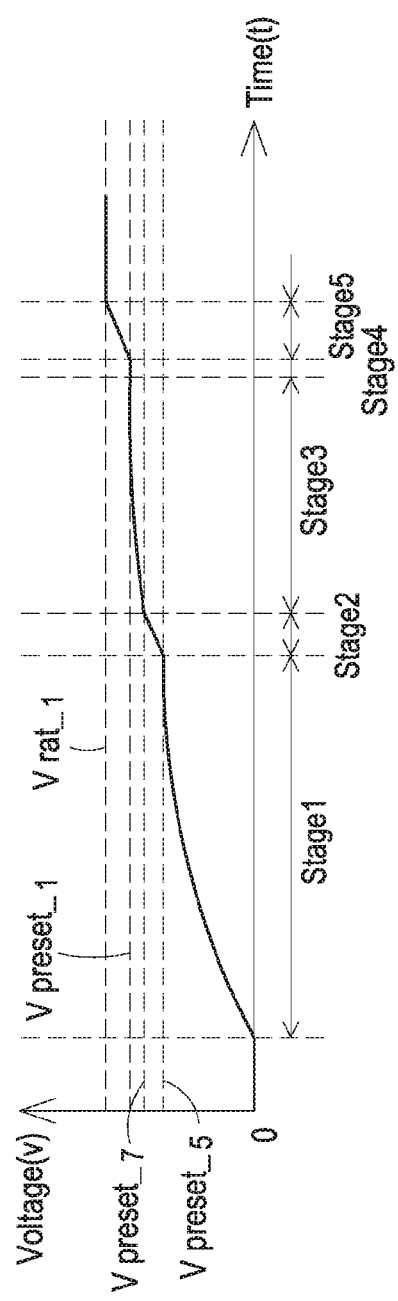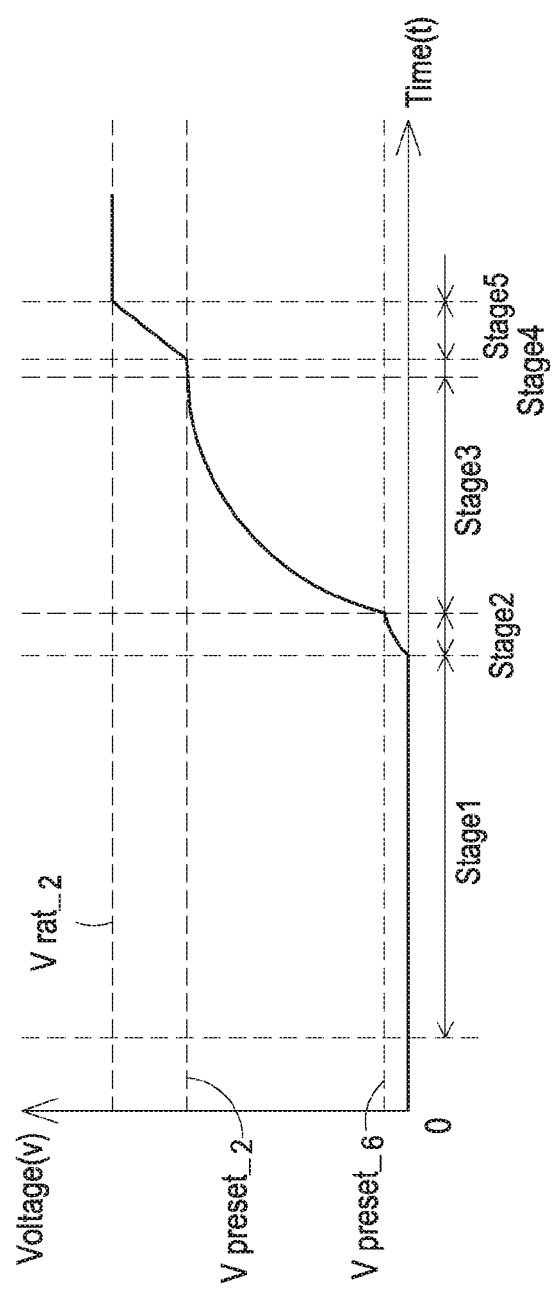

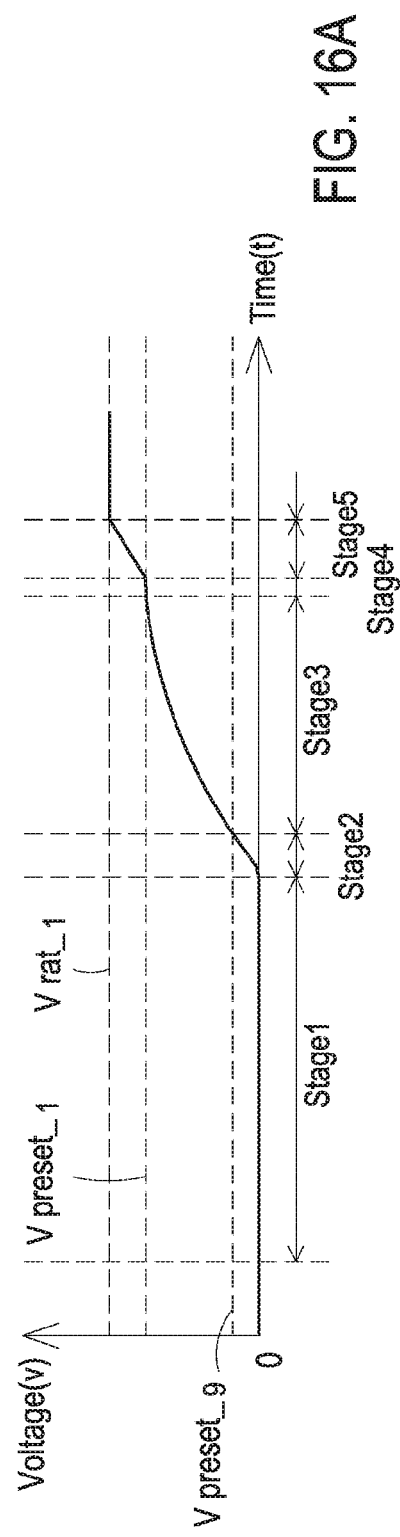
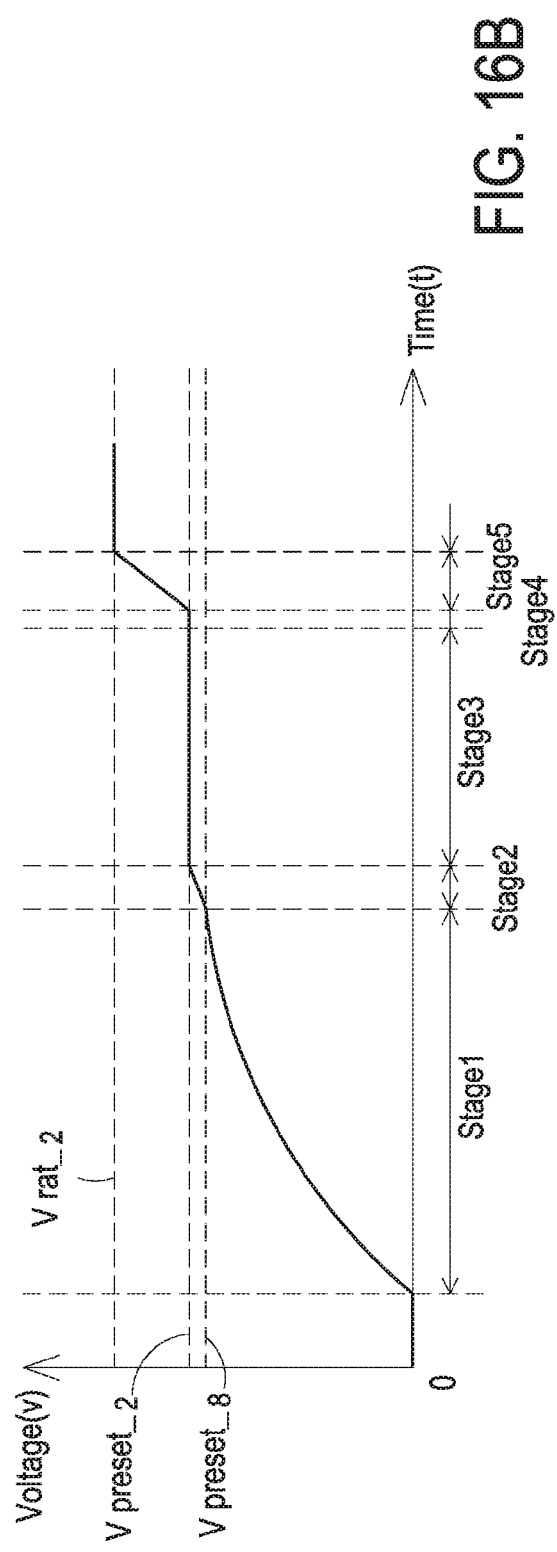

PRE-CHARGE CONTROL METHOD

FIELD OF THE INVENTION

The present invention relates to a pre-charge control method, and more particularly to a pre-charge control method for a hybrid multilevel power converter.

BACKGROUND OF THE INVENTION

Recently, a hybrid topology power converter with a three-level inverter and a cascaded H-bridge module was developed so as to provide a novel and high-power topology of multilevel power converter. To avoid the rush current damaging the three-level inverter and the H-bridge module, or damaging the DC bus capacitor when the hybrid topology power converter starts to operate, the DC bus capacitor of the system is pre-charged before the operation of the hybrid multilevel power converter.

In the traditional static Var generator (SVG) with the cascaded H-bridge module, grid connects the SVG via the current-limiting resistor unit and main breaker, and the pre-charge method is performed by turning on the main breaker and allowing the grid voltage to charge the DC bus capacitor of the H-bridge module via the current-limiting resistor unit.

However, in the hybrid topology power converter with the three-level inverter and the cascaded H-bridge module, when the grid voltage to charge the DC bus capacitor of the three-level inverter and the DC bus capacitor of the H-bridge module via the current-limiting resistor unit, the charging speed of the DC bus capacitor of the three-level inverter and the charging speed of the DC bus capacitor of the H-bridge module are different with each other, as the capacitance of the DC bus capacitor of the three-level inverter and the capacitance of the DC bus capacitor of the H-bridge module are different with each other. Consequently, it is difficult to control the voltage of the DC bus capacitor of the three-level inverter and the voltage of the DC bus capacitor of H-bridge module when the pre-charging process is finished, and the close-loop control of the hybrid topology power converter with the three-level inverter and the cascaded H-bridge module isn't easy to be achieved.

Moreover, another traditional pre-charge method is performed by pre-charge devices, which are additionally disposed in the three-level inverter and the H-bridge module to connect with respective DC bus capacitors of the three-level inverter and the H-bridge module. Although the pre-charge resistor unit and the soft-start contactor can be omitted and the voltage of the DC bus capacitor can be controlled by using the above-mentioned method when the pre-charge process is finished, plural pre-charge devices need to be employed additionally for coupling with the DC bus capacitors for pre-charging the DC bus capacitors. Consequently, the control of the hybrid multilevel power converter is difficult and complex.

Therefore, there is a need of providing a pre-charge control method for a hybrid multilevel power converter in order to eliminate the above drawbacks.

SUMMARY OF THE INVENTION

The present disclosure provides a pre-charge control method for a hybrid multilevel power converter. The voltages of the DC bus capacitors are well controlled after the pre-charge method is performed, and the close-loop control of the hybrid multilevel power converter is easy to be achieved. Moreover, it needn't to add pre-charge devices to connect with respective DC bus capacitors for performing the pre-charge process.

In accordance with one aspect of the present disclosure, a pre-charge control method for a hybrid multilevel power converter is provided. The hybrid multilevel power converter comprises a first converter, a second converter and a current-limiting resistor unit. The first converter comprises three H-bridge modules, each of the three H-bridge modules comprises at least one H-bridge circuit, each H-bridge circuit comprises a first capacitor unit, and the second converter comprises a second capacitor unit, wherein the three H-bridge modules are electrically connected with the second converter, and the three H-bridge modules are connected with the AC power by the current-limiting resistor unit. The pre-charge control method comprises steps of: (a) controlling the access of the current-limiting resistor unit, and limiting a current outputted from the AC power via the current-limiting resistor unit, and outputting the current; (b) controlling the second capacitor unit to bypass, and charging the first capacitor unit using the current; (c) controlling the access of the second capacitor unit when the first capacitor unit is charged to a third preset voltage, and allowing the current to charge the first capacitor unit and the second capacitor unit at the same time; (d) controlling the first capacitor unit to bypass when the second capacitor unit is charged to a fourth preset voltage, or the first capacitor unit is charged to a first preset voltage, and charging the second capacitor unit using the current; and (e) controlling the access of the first capacitor units and the current-limiting resistor unit to bypass when the second capacitor unit is charged to a second preset voltage.

In accordance with another aspect of the present disclosure, a pre-charge control method for a hybrid multilevel power converter is provided. The hybrid multilevel power converter comprises a first converter, a second converter and a current-limiting resistor unit. The first converter comprises three H-bridge modules, each of the three H-bridge modules comprises at least one H-bridge circuit, each H-bridge circuit comprises a first capacitor unit, and the second converter comprises a second capacitor unit, wherein the three H-bridge modules are electrically connected with the second converter, and the three H-bridge modules are connected with the AC power by the current-limiting resistor unit. The pre-charge control method comprises steps of: (a) controlling the access of the current-limiting resistor unit, and limiting a current outputted from the AC power via the current-limiting resistor unit, and outputting the current; (b) controlling the second capacitor unit to bypass, and charging the first capacitor unit using the current; (c) controlling the access of the second capacitor unit when the first capacitor unit is charged to a fifth preset voltage, and allowing the current to charge the first capacitor unit and the second capacitor unit at the same time; (d) controlling the first capacitor unit to bypass periodically when the second capacitor unit is charged to a sixth preset voltage or the first capacitor unit is charged to a seventh preset voltage, and allowing the current to charge the first capacitor unit and the second capacitor unit; and (e) controlling the access of the first capacitor unit and the current-limiting resistor unit to bypass when the second capacitor unit is charged to a second preset voltage or the first capacitor unit is charged to a first preset voltage.

In accordance with other aspect of the present disclosure, a pre-charge control method for a hybrid multilevel power converter is provided. The hybrid multilevel power converter comprises a first converter, a second converter and a current-limiting resistor unit. The first converter comprises three H-bridge modules, each of the three H-bridge modules comprises at least one H-bridge circuit, each H-bridge circuit comprises a first capacitor unit, and the second converter comprises a second capacitor unit, wherein the three H-bridge modules are electrically connected with the second converter, and the three H-bridge units are connected with the AC power by the current-limiting resistor unit. The pre-charge control method comprises steps of: (a) controlling the access of the current-limiting resistor unit, and limiting a current outputted from the AC power via the current-limiting resistor unit, and outputting the current; (b) controlling the first capacitor unit to bypass, and charging the second capacitor unit using the current; (c) controlling the access of the first capacitor unit when the second capacitor unit is charged to an eighth preset voltage, and allowing the current to charge the first capacitor unit and the second capacitor unit at the same time; (d) controlling the second capacitor unit to bypass when the first capacitor unit is charged to a ninth preset voltage or the second capacitor unit is charged to a second preset voltage, and charging the first capacitor unit using the current; and (e) controlling the access of the second capacitor unit and the current-limiting resistor unit to bypass when the first capacitor unit is charged to a first preset voltage.

In accordance with a further aspect of the present disclosure, a pre-charge control method for a hybrid multilevel power converter is provided. The hybrid multilevel power converter comprises a first converter, a second converter and a current-limiting resistor unit. The first converter comprises three H-bridge modules, each of the three H-bridge modules comprises at least one H-bridge circuit, each H-bridge circuit comprises a first capacitor unit, and the second converter comprises a second capacitor unit, wherein the three H-bridge modules are electrically connected with the second converter, and the three H-bridge modules are connected with the AC power by the current-limiting resistor unit. The pre-charge control method comprises steps of: (a) controlling the access of the current-limiting resistor unit, and limiting a current outputted from the AC power via current-limiting resistor unit, and outputting current; (b) controlling the first capacitor unit to bypass periodically, and charging the first capacitor unit and the second capacitor unit using the current; (c) controlling the access of the first capacitor unit when the second capacitor unit is charged to a tenth preset voltage or the first capacitor unit is charged to an eleventh preset voltage, and allowing the current to charge the first capacitor unit and the second capacitor unit; (d) controlling the second capacitor unit to bypass and charging the first capacitor unit using current when the first capacitor unit is charged to a twelfth preset voltage or the second capacitor unit is charged to a second preset voltage; and (e) controlling the access of the second capacitor unit and then the current-limiting resistor unit to bypass when the first capacitor unit is charged to a first preset voltage.

BRIEF DESCRIPTION OF THE DRAWINGS

FIGS. 8A and 8B show sequence diagrams of pre-charging the first capacitor unit and the second capacitor unit according to the first embodiment of the present disclosure;

FIGS. 12A to 12D are current simulation diagrams of the inventive hybrid multilevel power converter corresponding to the stages 1 to 4 of FIGS. 8A, 8B and 11 respectively;

FIGS. 14A and 14B show sequence diagrams of pre-charging the first capacitor unit and the second capacitor unit according to the second embodiment of the present disclosure;

FIGS. 16A and 16B show sequence diagrams of pre-charging the first capacitor unit and the second capacitor unit according to the third embodiment of the present disclosure;

DESCRIPTION OF THE PREFERRED EMBODIMENT

An exemplary embodiment embodying the features and advantages of this embodiment will be expounded in following paragraphs of descriptions. It is to be realized that the present disclosure is allowed to have various modification in different respects, all of which are without departing from the scope of the present disclosure, and the description herein and the drawings are to be taken as illustrative in nature, but not to be taken as a confinement for this embodiment.

Figure 1:
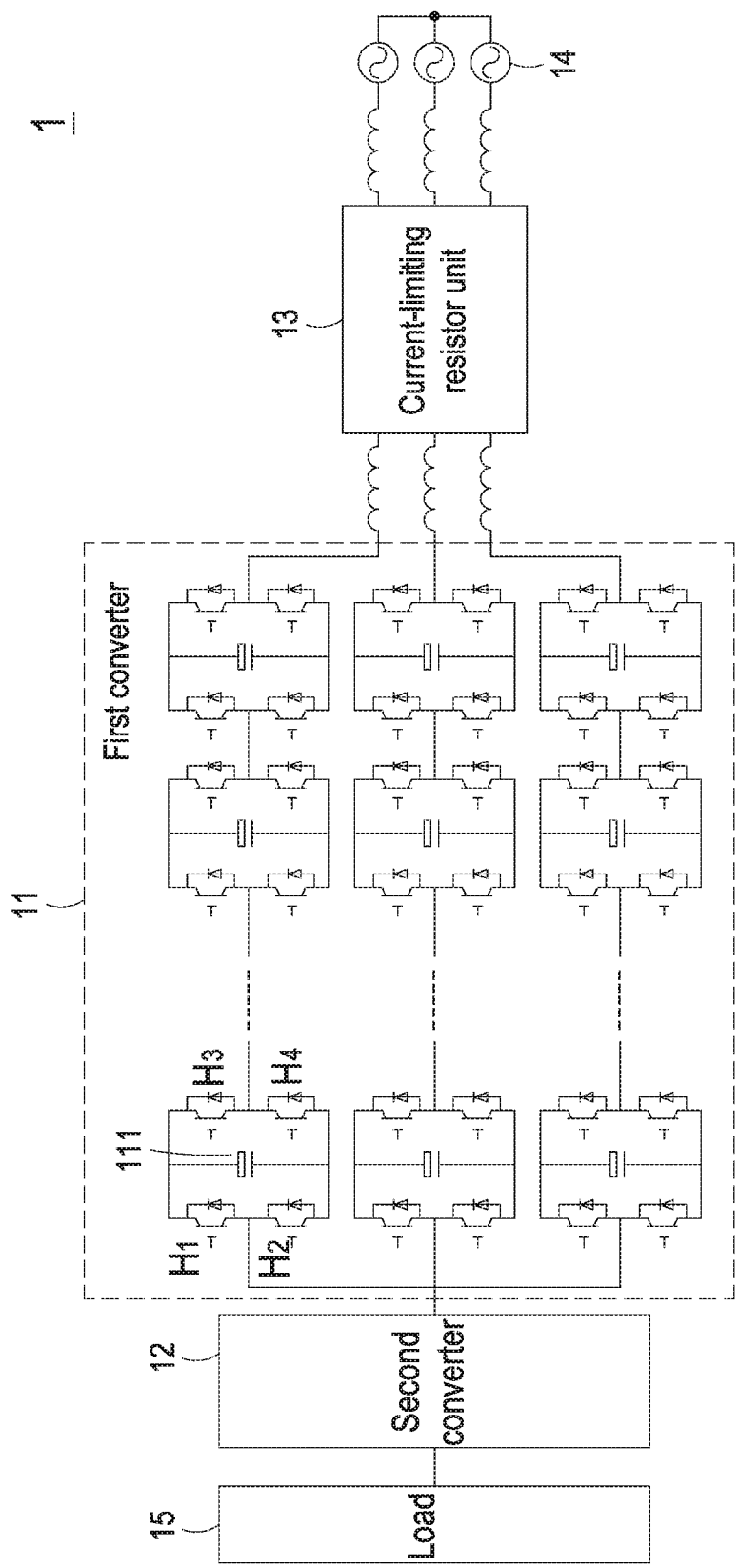
FIG. 1 is a circuit diagram illustrating the hybrid multilevel power converter according to an embodiment of the present disclosure.
Figure 2:
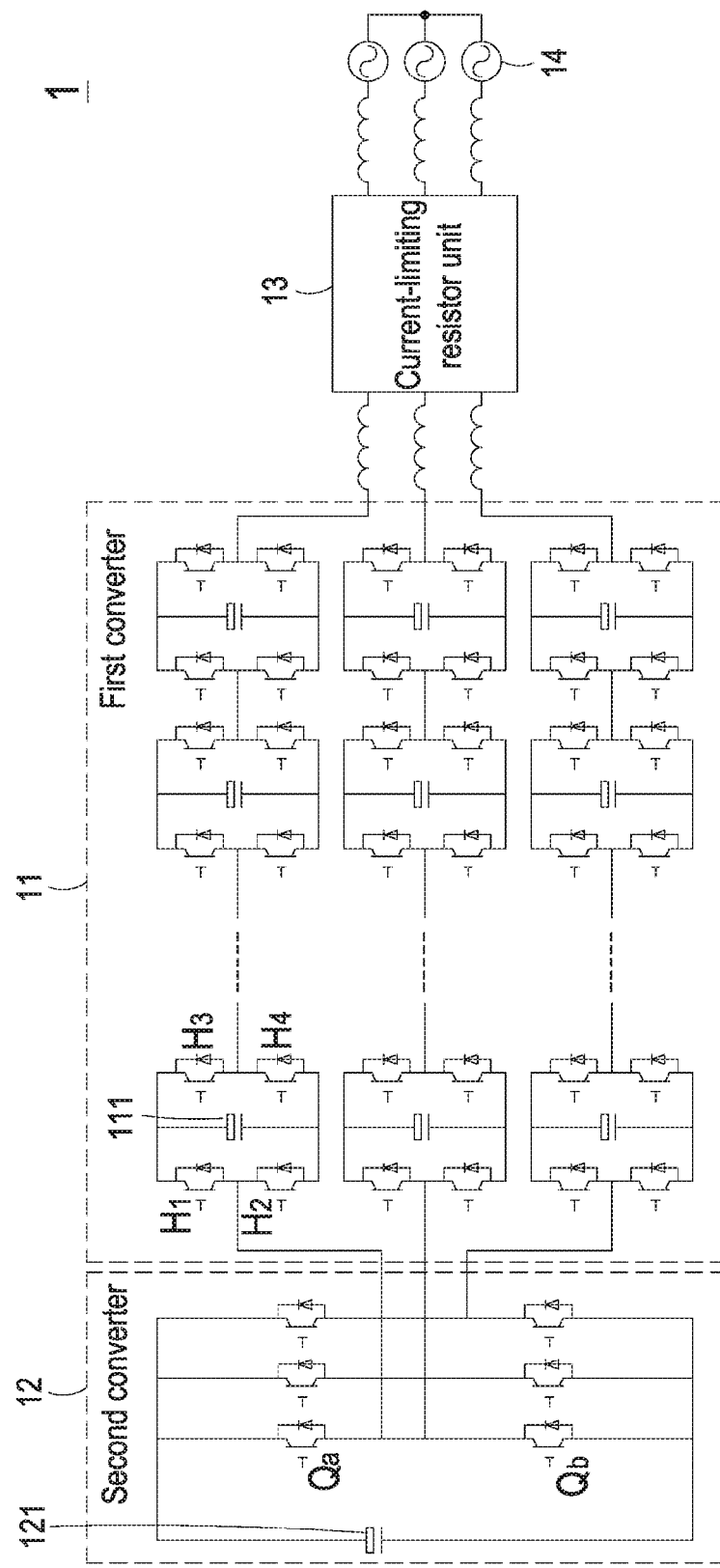
FIG. 2 is an exemplary circuit diagram of the hybrid multilevel power converter of FIG. 1, where the second converter circuit is a two-level inverter.
Figure 3:
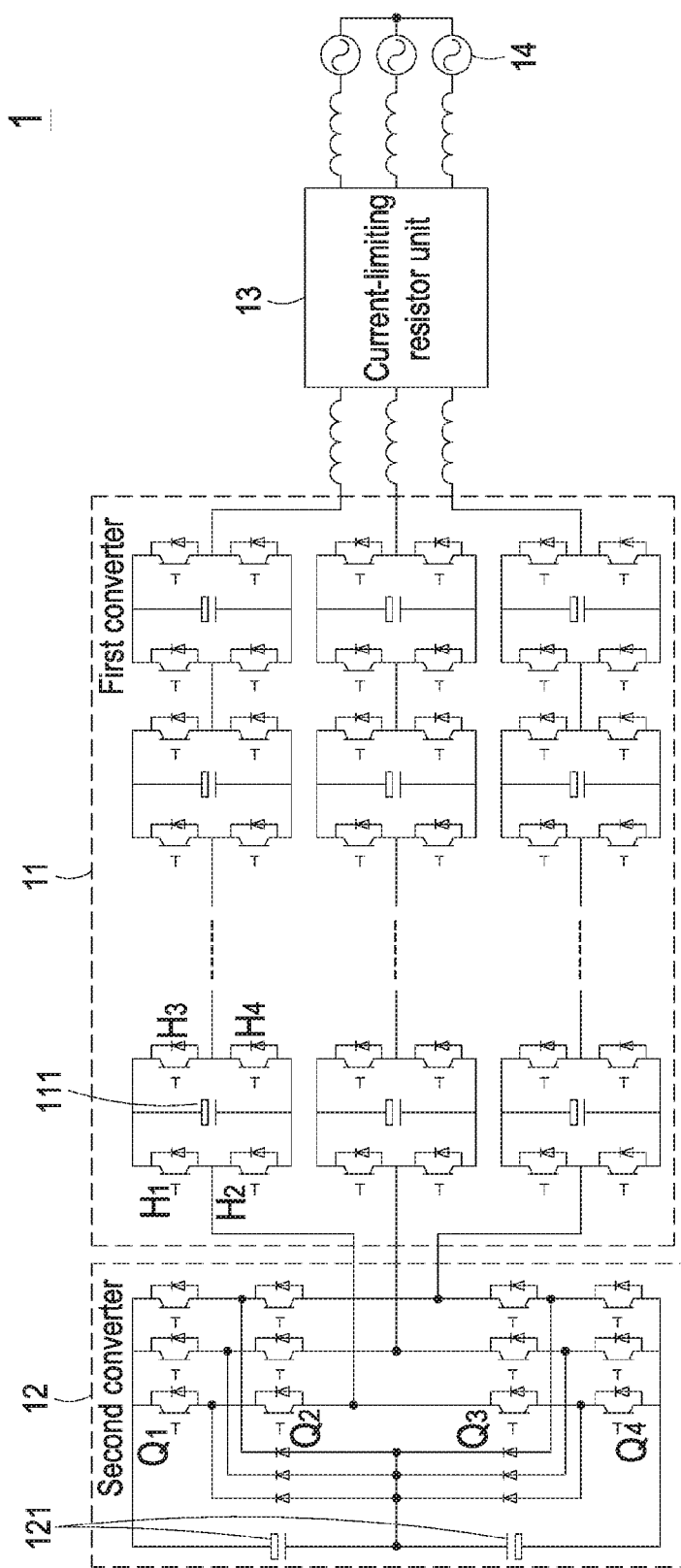
FIG. 3 is another exemplary circuit diagram of the hybrid multilevel power converter of FIG. 1, where the second converter circuit is a three-level inverter.
Figure 4A:
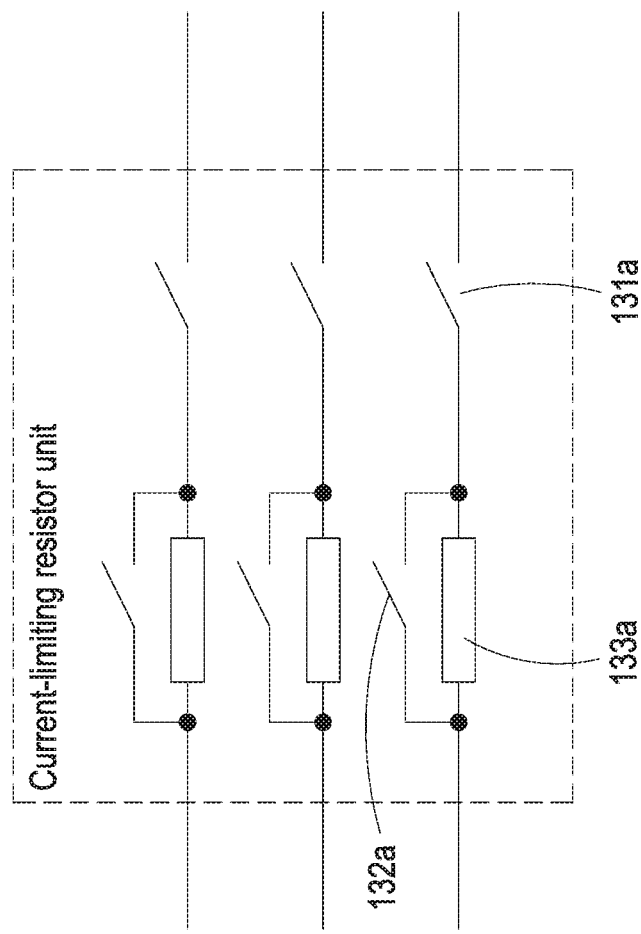
FIG. 4A is a circuit diagram illustrating an exemplary current-limiting resistor unit of FIG. 1.
Figure 4B:
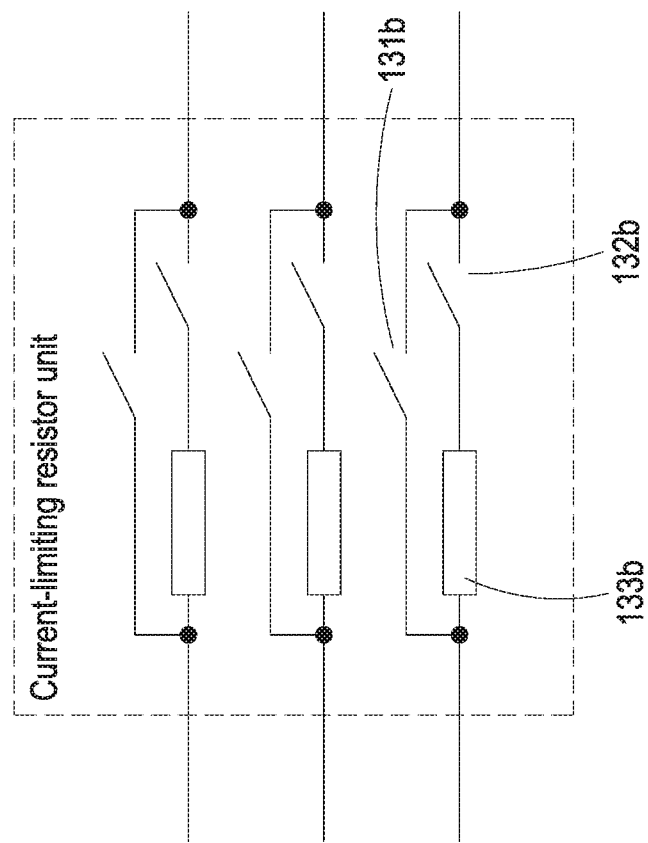
FIG. 4B is a circuit diagram illustrating another exemplary current-limiting resistor unit of FIG. 1.

FIG. 1 is a circuit diagram illustrating the hybrid multilevel power converter according to an embodiment of the present disclosure; FIG. 2 is an exemplary circuit diagram of the hybrid multilevel power converter of FIG. 1, where the second converter circuit is a two-level inverter; FIG. 3 is another exemplary circuit diagram of the hybrid multilevel power converter of FIG. 1, where the second converter circuit is a three-level inverter; FIG. 4A is a circuit diagram illustrating an exemplary current-limiting resistor unit of FIG. 1; and FIG. 4B is a circuit diagram illustrating another exemplary current-limiting resistor unit of FIG. 1. As shown in FIG. 1, the pre-charge method is applicable to a hybrid multilevel power converter 1. The hybrid multilevel power converter 1 comprises a first converter 11, a second converter 12 and a current-limiting resistor unit 13. The first converter 11 comprises three H-bridge modules, each of the three H-bridge modules comprises at least one H-bridge circuit, and each H-bridge circuit comprises a first capacitor unit 111 and two bridge legs connected in parallel with the first capacitor unit 111. Each of the two bridge legs comprises an upper leg and a lower leg. One upper leg includes a first H-bridge switch unit H1 and the other upper leg includes a third H-bridge switch unit H3, and one lower leg includes a second H-bridge switch unit H2 and the other lower leg includes a fourth H-bridge switch unit H4. Each of the first H-bridge switch unit H1, the second H-bridge switch unit H2, the third H-bridge switch unit H3 and the fourth H-bridge switch unit H4 comprises one or more switches. When above-mentioned H-bridge switch unit comprises plural switches, the plural switches can be connected in parallel, in series or in series and parallel. In this embodiment, the three H-bridge modules of the first converter 11 are electrically connected with a terminal of the second converter 12, and the three H-bridge modules of the first converter 11 are electrically connected with the current-limiting resistor unit 13 and further connected with the AC power 14 through the current-limiting resistor unit 13. Moreover, another terminal of the second converter 12 is connected with a load 15.

The second converter 12 is for example but not limited to a two-level inverter or a three-level inverter. In case that the second converter 12 is a two-level inverter, as shown in FIG. 2, the second converter 12 comprises a second capacitor unit 121 and three bridge legs connected in parallel with the second capacitor unit 121. Each of three bridge legs comprises an upper leg including a two-level first switch unit Qa and a lower leg including a two-level second switch unit Qb. Each of the two-level first switch units Qa and each of the two-level second switch units Qb comprise one or plural switches. When above-mentioned switch unit comprises plural switches, the plural switches can be connected in parallel, in series or in series and parallel. In this embodiment, the second capacitor unit 121 includes a single capacitor. Alternatively, the second capacitor unit 121 includes plural capacitors connected in parallel, in series or in series and parallel.

In case that the second converter 12 is a three-level inverter, as shown in FIG. 3, the second converter 12 comprises a second capacitor unit 121 and three bridge legs connected in parallel with the second capacitor unit 121. Each of the three bridge legs comprises an upper leg including a three-level first switch unit Q1 and a three-level second switch unit Q2 and a lower leg including a three-level third switch unit Q3 and a three-level fourth switch unit Q4. Each of the three-level first switch units Q1, the three-level second switch units Q2, the three-level third switch units Q3 and the three-level fourth switch units Q4 comprises one or plural switches. When above-mentioned switch unit comprises plural switches, the plural switches can be connected in parallel, in series or in series and parallel.

The current-limiting resistor unit 13 comprises three current-limiting circuits forming three paths, and each of the three current-limiting circuits comprises at least two switches and a resistor unit. In an embodiment, as shown in FIG. 4A, the current-limiting resistor unit 13a is employed in the hybrid multilevel power converter 1. The current-limiting resistor unit 13a comprises three current-limiting circuits forming three paths. Each of the three current-limiting circuits comprises a first switch 131a, a second switch 132a and a resistor unit 133a. The second switch 132a is electrically connected in parallel with the resistor unit 133a to form a parallel branch, and the parallel branch is connected in series with the first switch 131a. In another embodiment, as shown in FIG. 4B, the current-limiting resistor unit 13b is employed in the hybrid multilevel power converter 1. The current-limiting resistor unit 13b comprises three current-limiting circuits forming three paths. Each of the three current-limiting circuits comprises a third switch 131b, a fourth switch 132b and a resistor unit 133b. The fourth switch 132b is connected in series with the resistor unit 133b to form a series branch, and the series branch is connected in parallel with the third switch 131b. In this embodiment, the number of the resistor unit 133a in the current-limiting resistor unit 13a and the number of the resistor unit 133b in the current-limiting resistor unit 13b are not limited to a single one. Alternatively, the current-limiting resistor unit 13a and the current-limiting resistor unit 13b may include plural resistor units 133a and plural resistor units 133b respectively and connected in parallel, in series or in series and parallel.

Figure 5:
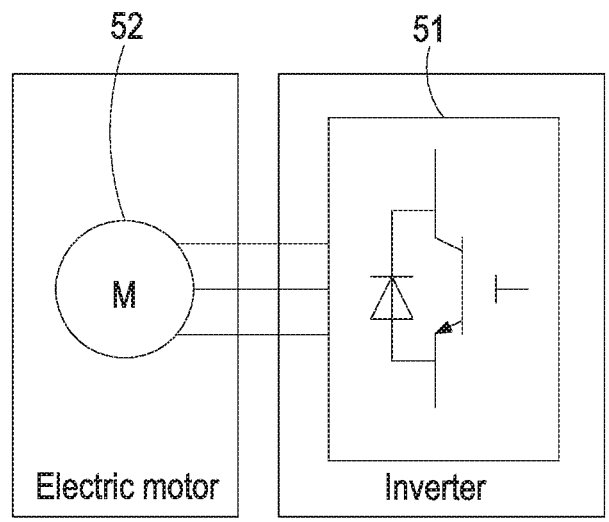
FIG. 5 is a schematic view illustrating an exemplary load of the hybrid multilevel power converter, where the load is an inverter connected with an electric motor.
Figure 6:
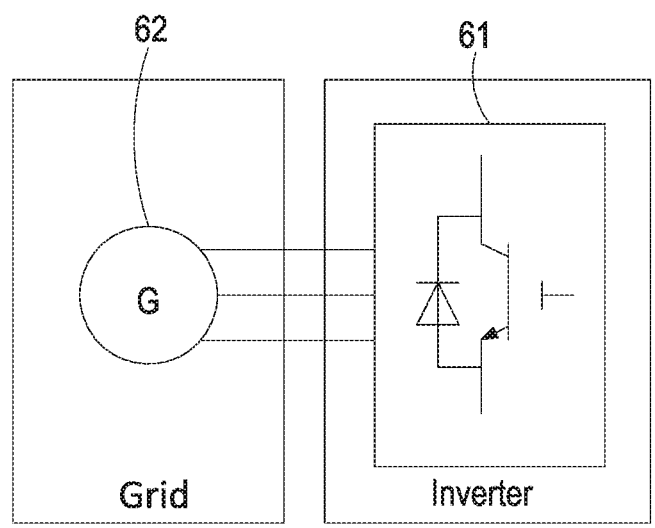
FIG. 6 is a schematic view illustrating another exemplary load of the hybrid multilevel power converter, where the load is an inverter connected with the grid.

FIG. 5 is a schematic view illustrating an exemplary load of the hybrid multilevel power converter, where the load is an inverter connected with an electric motor, and FIG. 6 is a schematic view illustrating another exemplary load of the hybrid multilevel power converter, where the load is an inverter connected with a grid. In an embodiment, as shown in FIGS. 1 and 5, in case that the AC power 14 is a grid, the load 15 can be a DC load or an inverter 51 connected with an electric motor 52. Under this circumstance, the hybrid multilevel power converter 1 is used as a variable-frequency inverter. In some embodiments, as shown in FIGS. 1 and 6, in case that the AC power 14 is a generator, the load 15 can be an inverter 61 connected with a grid 62. Under this circumstance, the hybrid multilevel power converter 1 is used as a wind turbine. In some embodiments, the hybrid multilevel power converter 1 fails to connect with the load 15. Under this circumstance, the hybrid multilevel power converter 1 is used as a static VAR generator.

Figure 7:
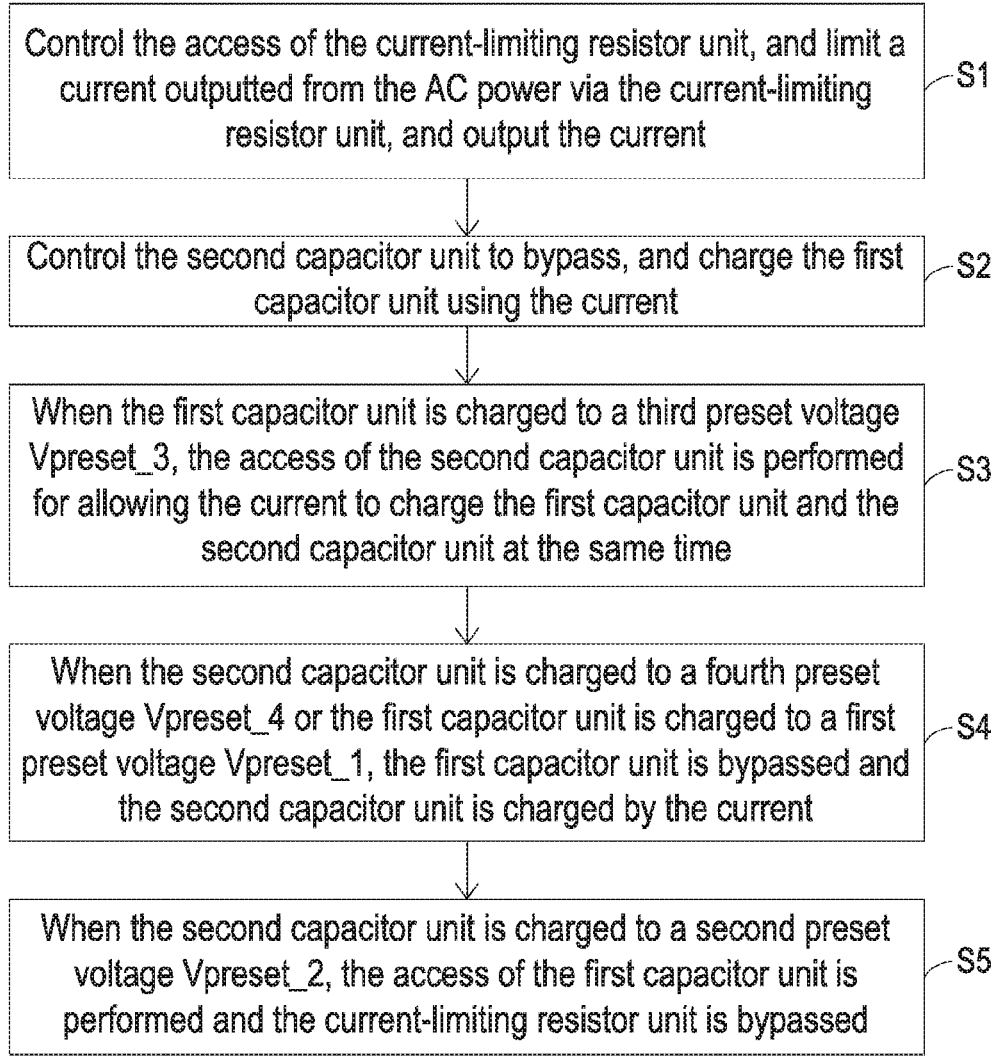
FIG. 7 shows a flowchart of pre-charge control method for the hybrid multilevel power converter according to a first embodiment of the present disclosure.

FIG. 7 shows a flowchart of pre-charge control method for the hybrid multilevel power converter according to the first embodiment of the present disclosure, and FIGS. 8A and 8B show sequence diagrams of pre-charging the first capacitor unit and the second capacitor unit according to the first embodiment of the present disclosure. As shown in FIGS. 1, 7, 8A and 8B, the pre-charge control method of the present disclosure comprises the following steps. Firstly, as shown in step S1, control the access of the current-limiting resistor unit 13, and limit a current outputted from the AC power 14 via the current-limiting resistor unit 13, and output the current. In an embodiment, in case that the current-limiting resistor unit 13a as shown in FIG. 4A is employed, the current-limiting method comprise step of: controlling the first switch 131a of each of three current-limiting circuits to turn on and the second switch 132a of each of three current-limiting circuits to turn off respectively, so that the access of the resistor unit 133a of each current-limiting circuits is performed and the current-limiting is performed via the resistor unit 133a. In another embodiment, in case that the current-limiting resistor unit 13b as shown in FIG. 4B is employed, the current-limiting method comprise step of: controlling the fourth switch 132b of each of three current-limiting circuits to turn on and the third switch 131b of each of three current-limiting circuits to turn off respectively, so that the access of the resistor unit 133b of each of three current-limiting circuits is performed and the current-limiting is performed by the resistor unit 133b of each of three current-limiting circuits.

Then, as shown in step S2, control the second capacitor unit 121 to bypass, and charge the first capacitor unit 111 using the current. In some embodiments, in case that the second converter 12 is a two-level inverter, the method of bypassing the second capacitor unit 121 comprises step of: controlling the two-level first switch units Qa of the three bridge legs of the second converter 12 to turn on at the same time, controlling the two-level second switch units Qb of the three bridge legs of the second converter 12 to turn on at the same time, or controlling the two-level first switch units Qa and the two-level second switch units Qb to alternately turn on so as to bypass the second capacitor unit 121. Consequently, the first capacitor unit 111 is charged by the current.

In this embodiment, if the two-level first switch units Qa of the second converter 12 are turned on at the same time, it means that the two-level first switch units Qa of the upper legs of the three bridge legs of the second converter 12 are turned on at the same time, and the two-level second switch units Qb of the lower legs of the three bridge legs of the second converter 12 are turned off during the period that the two-level first switch units Qa of the upper legs of the three bridge legs of the second converter 12 are turned on. In addition, if the two-level second switch units Qb of the second converter 12 are turned on at the same time, it means that the two-level second switch units Qb of the lower legs of the three bridge legs of the second converter 12 are turned on at the same time, and the two-level first switch units Qa of the upper legs of the three bridge legs of the second converter 12 are turned off during the period that the two-level second switch units Qb of the lower legs of the three bridge legs of the second converter 12 are turned on. Moreover, if the two-level first switch units Qa of the second converter 12 and the two-level second switch units Qb of the second converter 12 are alternately turned on, it means that the two-level first switch units Qa of the upper legs of the three bridge legs of the second converter 12 and the two-level second switch units Qb of the lower legs of the three bridge legs of the second converter 12 are alternately turn on. Namely, the two-level first switch units Qa of the upper legs of the bridge legs of the second converter 12 are turn on for a specific period and then turned off after the specific period. Thereafter, the two-level second switch units Qb of the lower legs of the three bridge legs of the second converter 12 are turned on for another specific period and then turned off after the specific period. Thereafter, the two-level first switch units Qa of the upper legs of the three bridge legs of the second converter 12 are turn on again, and the above-mentioned process are performed continuously and repeatedly. Consequently, the two-level first switch units Qa and the two-level second switch units Qb are alternately turned on. It is noted that the order and the time periods of turning on the first switch units Qa and the second switch units Qb aren't limited to the above-described embodiments and can be adjusted according to the practical requirements.

In addition, when the two-level first switch units Qa of the upper legs of the three bridge legs of the second converter 12 are turned on, the two-level second switch units Qb of the lower legs of the three bridge legs of the second converter 12 are turned off. When the two-level second switch units Qb of the lower legs of the three bridge legs of the second converter 12 are turned on, the two-level first switch units Qa of the upper legs of the three bridge legs of the second converter 12 are turned off.

In some embodiments, in case that the second converter 12 is a three-level inverter, the method of bypassing the second capacitor unit 121 comprises the steps of: controlling the three-level first switch units Q1 of the second converter 12 and the three-level second switch units Q2 of the second converter 12 to turn on at the same time, controlling the three-level third switch units Q3 of the second converter 12 and the three-level fourth switch units Q4 of the second converter 12 to turn on at the same time, controlling the three-level second switch units Q2 of the second converter 12 and the three-level third switch units Q3 of the second converter 12 to turn on at the same time, or controlling at least two groups including the group of the three-level first switch units Q1 and the three-level second switch units Q2, the group of the three-level third switch units Q3 and the three-level fourth switch units Q4 and the group of the three-level second switch units Q2 and the three-level third switch units Q3 to alternately turn on so as to bypass the second capacitor unit 121. Consequently, the first capacitor unit 111 is charged by the current. It is noted that the group of the three-level first switch units Q1 and the three-level second switch units Q2 means that the three-level first switch units Q1 and the three-level second switch units Q2 are turned on or turned off at the same time, i.e. the conducting status between the three-level first switch units Q1 and the three-level second switch units Q2 are the same.

In this embodiment, if the three-level first switch units Q1 and the three-level second switch units Q2 are turned on at the same time, it means that the three-level first switch units Q1 and the three-level second switch units Q2 of each of the bridge legs of the second converter 12 are turned on at the same time, and the three-level third switch units Q3 and the three-level fourth switch units Q4 of each of the bridge legs of the second converter 12 are turned off during the period that the three-level first switch units Q1 and the three-level second switch units Q2 are turned on. In addition, if the three-level third switch units Q3 and the three-level fourth switch units Q4 are turned on at the same time, it means that the three-level third switch units Q3 and the three-level fourth switch units Q4 of each of the bridge legs of the second converter 12 are turned on, and the three-level first switch units Q1 and the three-level second switch units Q2 of each of the bridge legs of the second converter 12 are turned off during the period that the three-level third switch units Q3 and the three-level fourth switch units Q4 are turned on. Moreover, if the three-level second switch units Q2 and the three-level third switch units Q3 are turned on at the same time, it means that the three-level second switch units Q2 and the three-level third switch units Q3 of each of the bridge legs of the second converter 12 are turned on at the same time, and the three-level first switch units Q1 and the three-level fourth switch units Q4 of each of the bridge legs of the second converter 12 are turned off during the period that the three-level second switch units Q2 and the three-level third switch units Q3 are turned on. Furthermore, if at least two groups including the group of the three-level first switch units Q1 and the three-level second switch units Q2, the group of the three-level third switch units Q3 and the three-level fourth switch units Q4 and the group of the three-level second switch units Q2 and the three-level third switch units Q3 are alternately turned on, it means that any two of the above-mentioned three groups or all of the above-mentioned three groups are alternately turned on. For example, the group of the three-level first switch units Q1 and the three-level second switch units Q2 of each of the bridge legs of the second converter 12 are turned on for a specific period and then turned off after the specific period. Thereafter, the group of the three-level third switch units Q3 and the three-level fourth switch units Q4 are turned on for another specific period and then turned off after the specific time period. Then, the group of the three-level second switch units Q2 and the three-level third switch units Q3 are turned on for a specific period and then turned off after the specific time period. Thereafter, the group of the three-level first switch units Q1 and the three-level second switch units Q2 are turned on again, and the above-mentioned process is performed continuously and repeatedly. Consequently, the above-mentioned groups are alternately turned on. It is noted that the order and the turning-on periods among the group of the three-level first switch units Q1 and the three-level second switch units Q2, the group of the three-level third switch units Q3 and the three-level fourth switch units Q4 and the group of the three-level second switch units Q2 and the three-level third switch units Q3 aren't limited to the above-described embodiment and can be adjusted according to the practical requirements. In addition, when one of the above-mentioned groups is turned on, the others of the above-mentioned groups are turned off.

As shown in FIGS. 8A and 8B, the stage 1 is corresponding to the step S2 of the pre-charge control method. At the stage 1, the voltage of the first capacitor unit 111 raises continuously due to that the first capacitor unit 111 is charged by the current firstly (see FIG. 8A). In addition, the voltage of the second capacitor unit 121 doesn't change due to that the second capacitor unit 121 is bypassed (see FIG. 8B).

Then, as shown in step S3, when the first capacitor unit 111 is charged to a third preset voltage Vpreset_3, the access of the second capacitor unit 121 is performed for allowing the current to charge the first capacitor unit 111 and the second capacitor unit 121 at the same time. As shown in FIGS. 8A and 8B, the stage 2 is corresponding to the step S3 of the pre-charge control method. At the stage 2, the voltages of the first capacitor unit 111 and the second capacitor unit 121 raise due to that the current charges the first capacitor unit 111 and the second capacitor unit 121 at the same time (see FIGS. 8A and 8B).

Then, as shown in step S4, when the second capacitor unit 121 is charged to a fourth preset voltage Vpreset_4 or the first capacitor unit 111 is charged to a first preset voltage Vpreset_1, the first capacitor unit 111 is bypassed. The method of bypassing the first capacitor unit 111 includes the steps of: controlling the first H-bridge switch units H1 and the third H-bridge switch units H3 of the first converter 11 to turn on at the same time, controlling the second H-bridge switch units H2 and the fourth H-bridge switch units H4 of the first converter 11 to turn on at the same time, or controlling the group of the first H-bridge switch units H1 and the third H-bridge switch units H3 and the group of the second H-bridge switch units H2 and the fourth H-bridge switch units H4 to alternately turn on so as to bypass the first capacitor unit 111. Consequently, the second capacitor unit 121 is charged by the current. As shown in FIGS. 8A and 8B, the stage 3 is corresponding to the step S4 of the pre-charge control method. At the stage 3, the voltage of the first capacitor unit 111 doesn't raise anymore due to that the first capacitor unit 111 is bypassed (see FIG. 8A), and the voltage of the second capacitor unit 121 raises continuously due to that the second capacitor unit 121 is charged continuously (see FIG. 8B).

Finally, as shown in step S5, when the second capacitor unit 121 is charged to a second preset voltage Vpreset_2, the access of the first capacitor unit 111 is performed and the current-limiting resistor unit 13 is bypassed. In some embodiments, when the current-limiting resistor unit 13a of FIG. 4A is employed, the method of controlling the current-limiting resistor unit 13a to bypass comprises the steps of: controlling the second switch 132a of each of the three current-limiting circuits to turn on, and allowing the first switch 131a of each of the three current-limiting circuits to turn on continuously so as to bypass the resistor unit 133a of each of the three current-limiting circuits. In some embodiments, when the current-limiting resistor unit 13b of FIG. 4B is employed, the method of controlling the current-limiting resistor unit 13b to bypass comprises the steps of: controlling the third switch 131b of each of the current-limiting circuits to turn on so as to bypass the resistor unit 133b of each of the three current-limiting circuits. As shown in FIGS. 8A and 8B, the stage 4 is corresponding to the step S5 of the pre-charge control method. At the stage 4, the first capacitor unit 111 and the second capacitor unit 121 aren't charged by the current when the voltages of the first capacitor unit 111 and the second capacitor unit 121 are higher than that of the AC power 14. Consequently, the voltages of the first capacitor unit 111 and the second capacitor unit 121 doesn't raise. The first capacitor unit 111 and the second capacitor unit 121 are charged continuously by the current when the voltages of the first capacitor unit 111 and the second capacitor unit 121 are slightly lower than that of the AC power 14. Consequently, the voltages of the first capacitor unit 111 and the second capacitor unit 121 raise slightly.

Moreover, after the step S5, the pre-charge control method of the present disclosure further comprises the step S6 of performing the close-loop control, so that the first capacitor unit 111 is charged to a first rated voltage Vrat_1, and the second capacitor unit 121 is charged to a second rated voltage Vrat_2. In some embodiments, in case that the second converter 12 is the two-level inverter, the first capacitor unit 111 is charged to the first rated voltage Vrat_1 and the second capacitor unit 121 is charged to the second rated voltage Vrat_2 by controlling the first H-bridge switch units H1 to the fourth H-bridge switch units H4 of the first converter 11 and the two-level first switch units Qa to the two-level second switch units Qb of the second converter 12 to perform the close-loop control. In some embodiments, in case that the second converter 12 is the three-level inverter, the first capacitor unit 111 is charged to the first rated voltage Vrat_1 and the second capacitor unit 121 is charged to the second rated voltage Vrat_2 by controlling the first H-bridge switch units H1 to the fourth H-bridge switch units H4 of the first converter 11 and the three-level first switch units Q1 to the three-level fourth switch units Q4 of the second converter 12 to perform the close-loop control. As shown in FIGS. 8A and 8B, the stage 5 is corresponding to the step S6 of the pre-charge control method. At stage 5, the first capacitor unit 111 is charged to the first rated voltage Vrat_1 and the second capacitor unit 121 is charged to the second rated voltage Vrat_2 by performing the close-loop control. In this embodiment, the close-loop control means that the first converter 11 and the second converter 12 are operated in normal. In case that the second converter 12 is the two-level inverter, the two-level first switch unit Qa of one of the three bridge legs of the second converter 12 is turned on, and the two-level second switch units Qb of the other two bridge legs of the second converter 12 are turned on, and the first H-bridge switch units H1 and the fourth H-bridge switch units H4 are turned on. Under this circumstance, the hybrid multilevel power converter 1 is operated in normal. It is noted that the status of the two-level inverter under the close-loop control isn't limited to the normal status as described above and can be other status according to the practical requirements.

Figure 9:
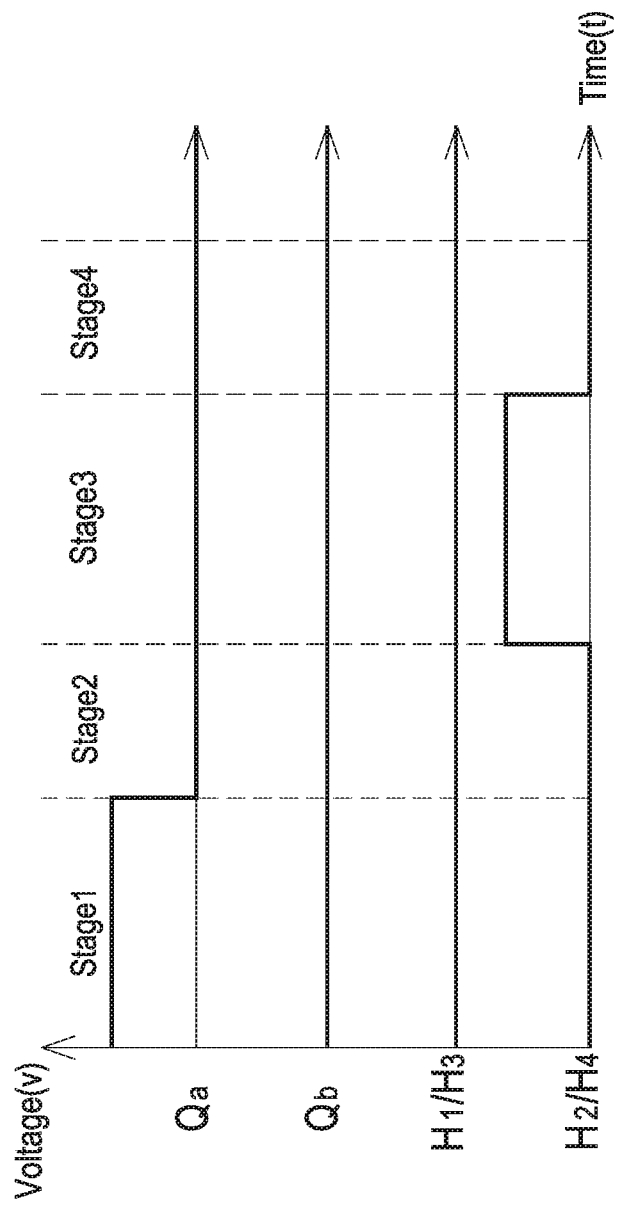
FIG. 9 is an exemplary sequence diagram of switch signal of the inventive hybrid multilevel power converter corresponding to different stages of FIGS. 8A and 8B, wherein the second converter circuit is a two-level inverter.
Figure 10A:
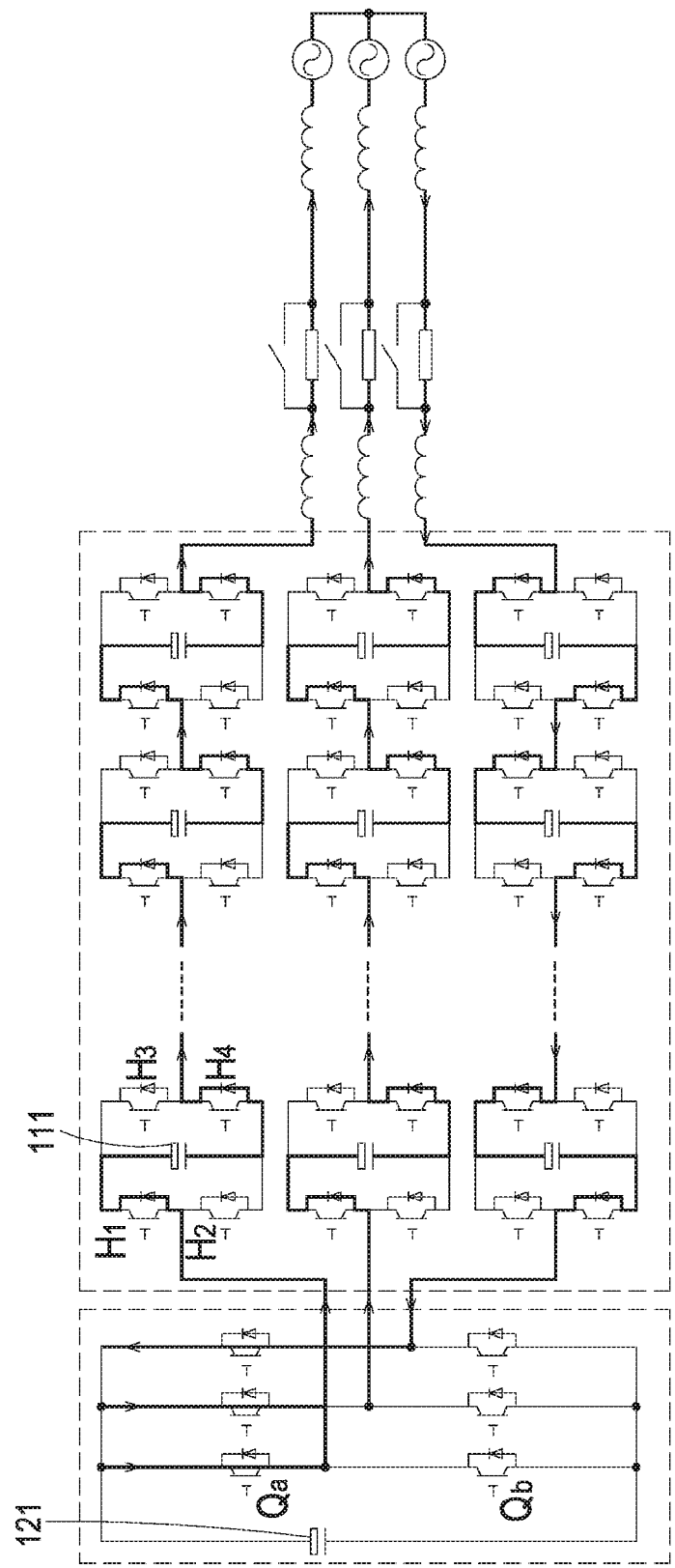
FIGS. 10A to 10D are current simulation diagrams of the inventive hybrid multilevel power converter corresponding to the stages 1 to 4 of FIGS. 8A, 8B and 9 respectively.
Figure 10B:
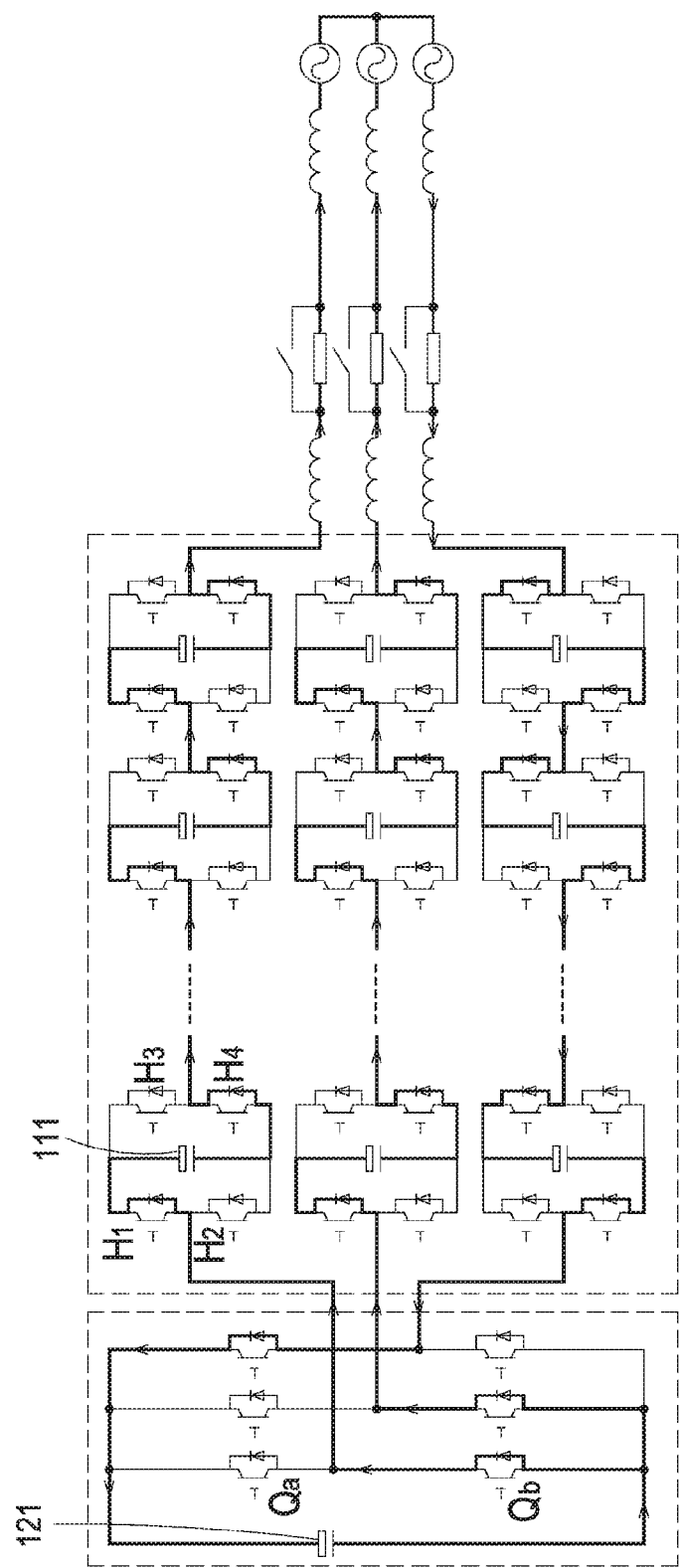
Figure 10C:
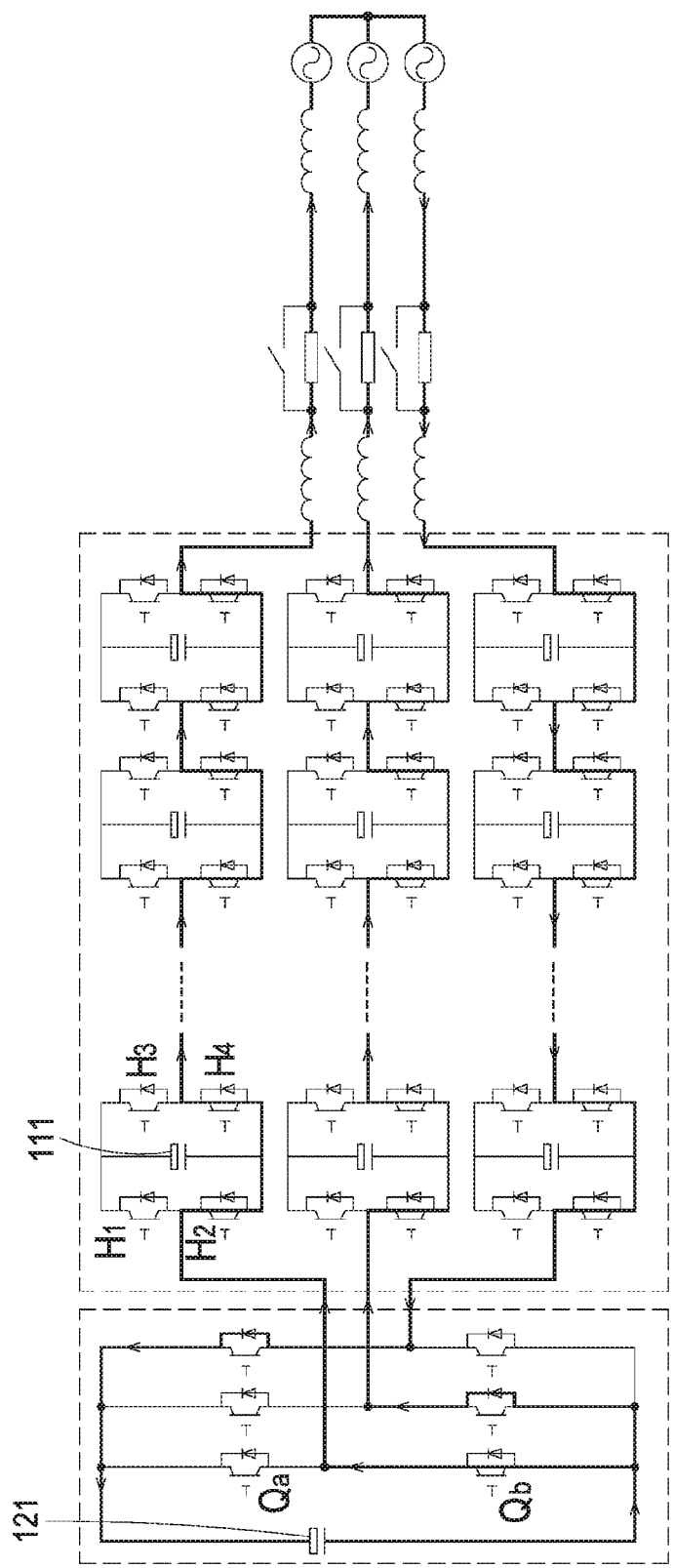
Figure 10D:
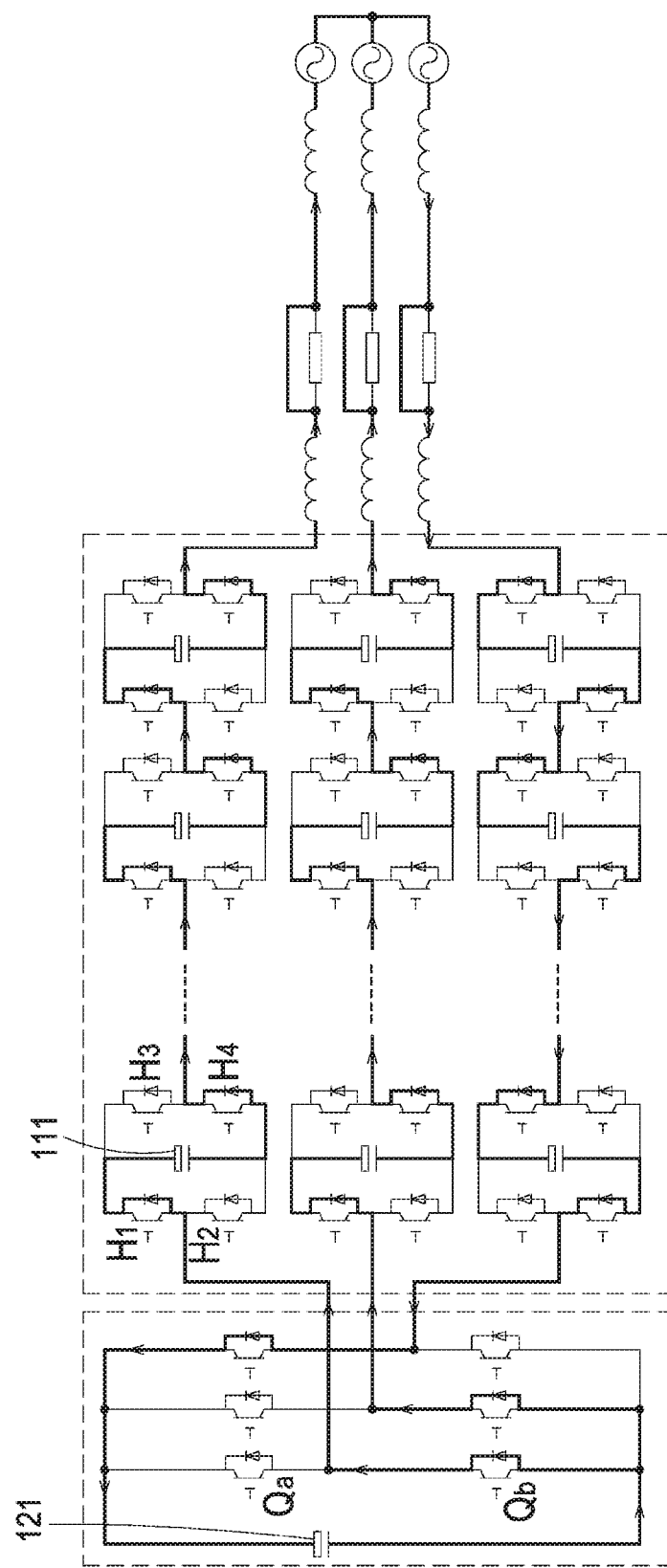
Figure 11:
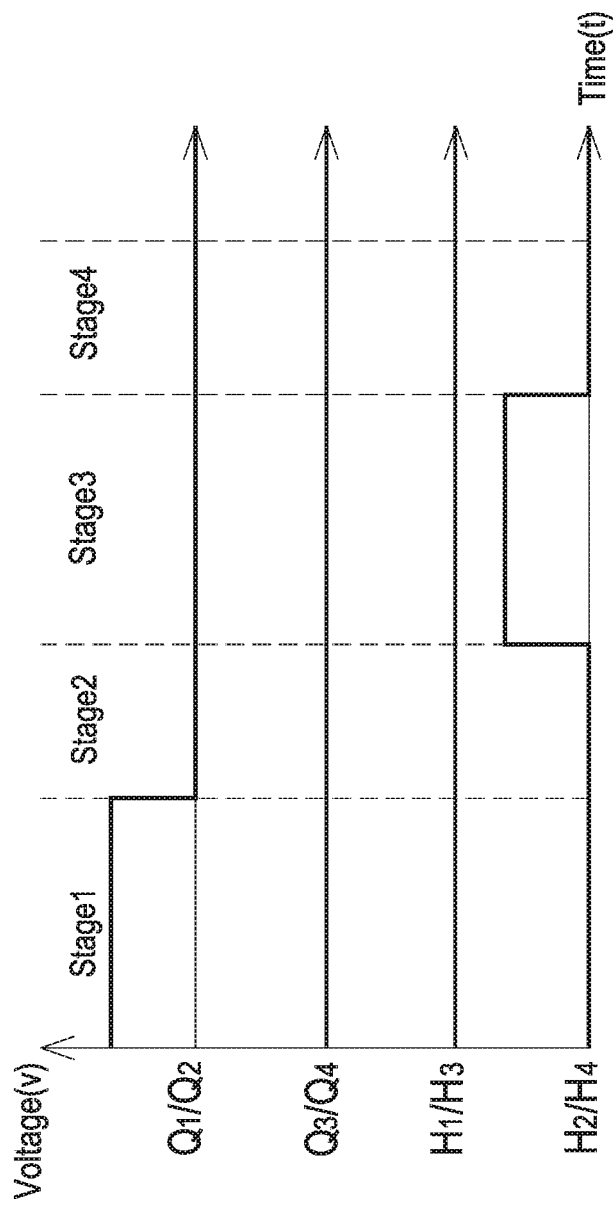
FIG. 11 is a sequence diagram of switch signal of the inventive hybrid multilevel power converter corresponding to different stages of FIGS. 8A and 8B, wherein the second converter circuit is a three-level inverter.

FIG. 9 is an exemplary sequence diagram of switch signal of the inventive hybrid multilevel power converter corresponding to different stages of FIGS. 8A and 8B, wherein the second converter circuit is a two-level inverter. FIGS. 10A to 10D are current simulation diagrams of the inventive hybrid multilevel power converter corresponding to the stages 1 to 4 of FIGS. 8A, 8B and 9 respectively. FIG. 11 is a sequence diagram of switch signal of the inventive hybrid multilevel power converter corresponding to different stages of FIGS. 8A and 8B, wherein the second converter circuit is a three-level inverter. FIGS. 12A to 12D are current simulation diagrams of the inventive hybrid multilevel power converter corresponding to the stages 1 to 4 of FIGS. 8A, 8B and 11 respectively.

Figure 12A:
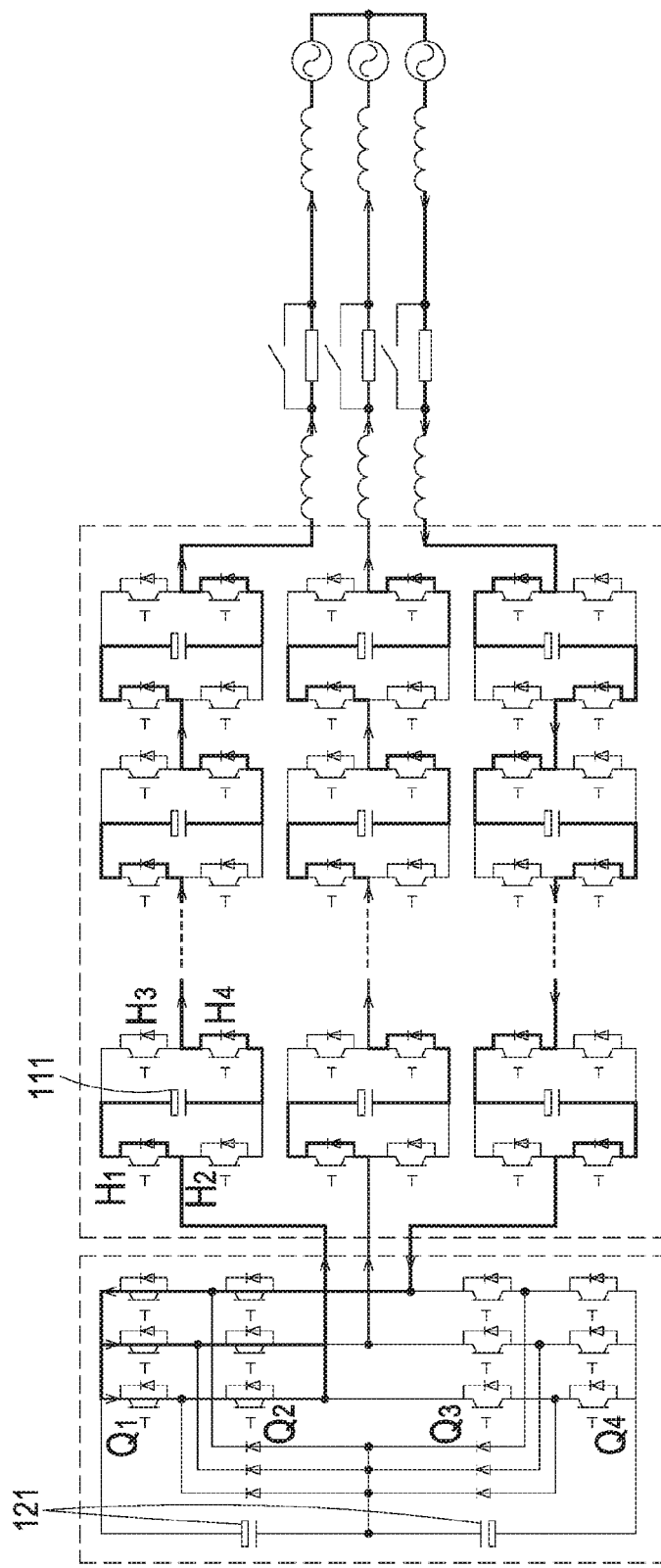

Please refer to the stage 1 of the FIG. 9, which is corresponding to the stage 1 of the FIGS. 8A and 8B. At the stage 1 of FIG. 9, the two-level first switch units Qa are turned on and the two-level second switch units Qb are turned off. Under this circumstance, the current flows through the two-level first switch units Qa and bypasses the second capacitor unit 121. In addition, the first H-bridge switch units H1 to the fourth H-bridge switch units H4 are turned off. Consequently, the current flows through and charges the first capacitor unit 111, and the corresponding current simulation diagram is shown in FIG. 10A. Please refer to the stage 1 of FIG. 11, which is corresponding to the stage 1 of the FIGS. 8A and 8B. At the stage 1 of FIG. 11, three-level first switch units Q1 and the three-level second switch units Q2 are turned on, and the three-level third switch units Q3 and the three-level fourth switch units Q4 are turned off. Under this circumstance, the current flows through the three-level first switch units Q1 and the three-level second switch units Q2, and bypasses the second capacitor unit 121. In addition, the first H-bridge switch units H1 to the fourth H-bridge switch units H4 are turned off. Under this circumstance, the current flows through and charges the first capacitor unit 111, and the corresponding current simulation diagram is shown in FIG. 12A.

Figure 12B:
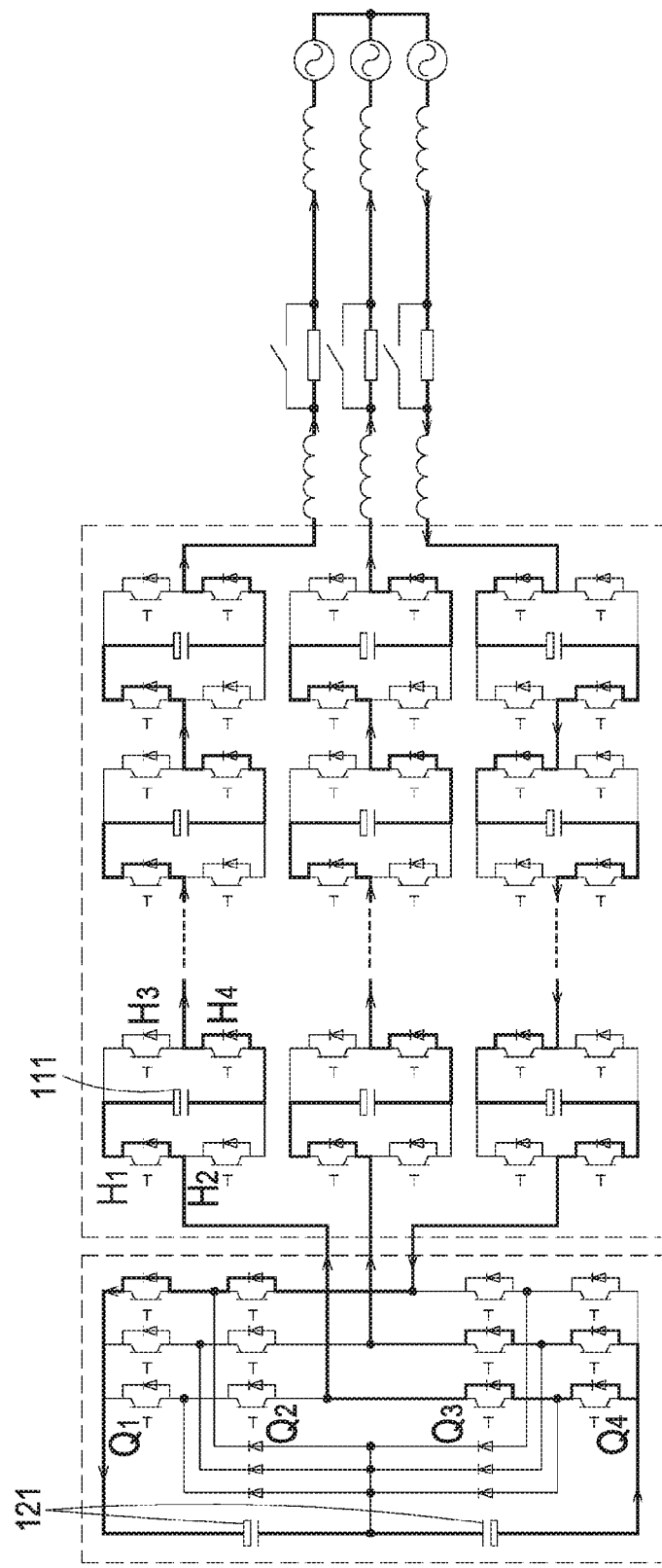

Please refer to the stage 2 of the FIG. 9, which is corresponding to the stage 2 of the FIGS. 8A and 8B. At the stage 2 of FIG. 9, the two-level first switch units Qa and the two-level second switch units Qb are turned off. Under this circumstance, the current flows through and charges the second capacitor unit 121. In addition, the first H-bridge switch units H1 to the fourth H-bridge switch units H4 are turned off. Under this circumstance, the current flows through and charges the first capacitor unit 111, and the corresponding current simulation diagram is shown in FIG. 10B. Please refer to the stage 2 of FIG. 11, which is corresponding to the stage 2 of the FIGS. 8A and 8B. At the stage 2 of FIG. 11, three-level first switch units Q1 to the three-level fourth switch units Q4 are turned off. Under this circumstance, the current flows through and charges the second capacitor unit 121. In addition, the first H-bridge switch units H1 to the fourth H-bridge switch units H4 are turned off. Under this circumstance, the current flows through and charges the first capacitor unit 111, and the corresponding current simulation diagram is shown in FIG. 12B.

Figure 12C:
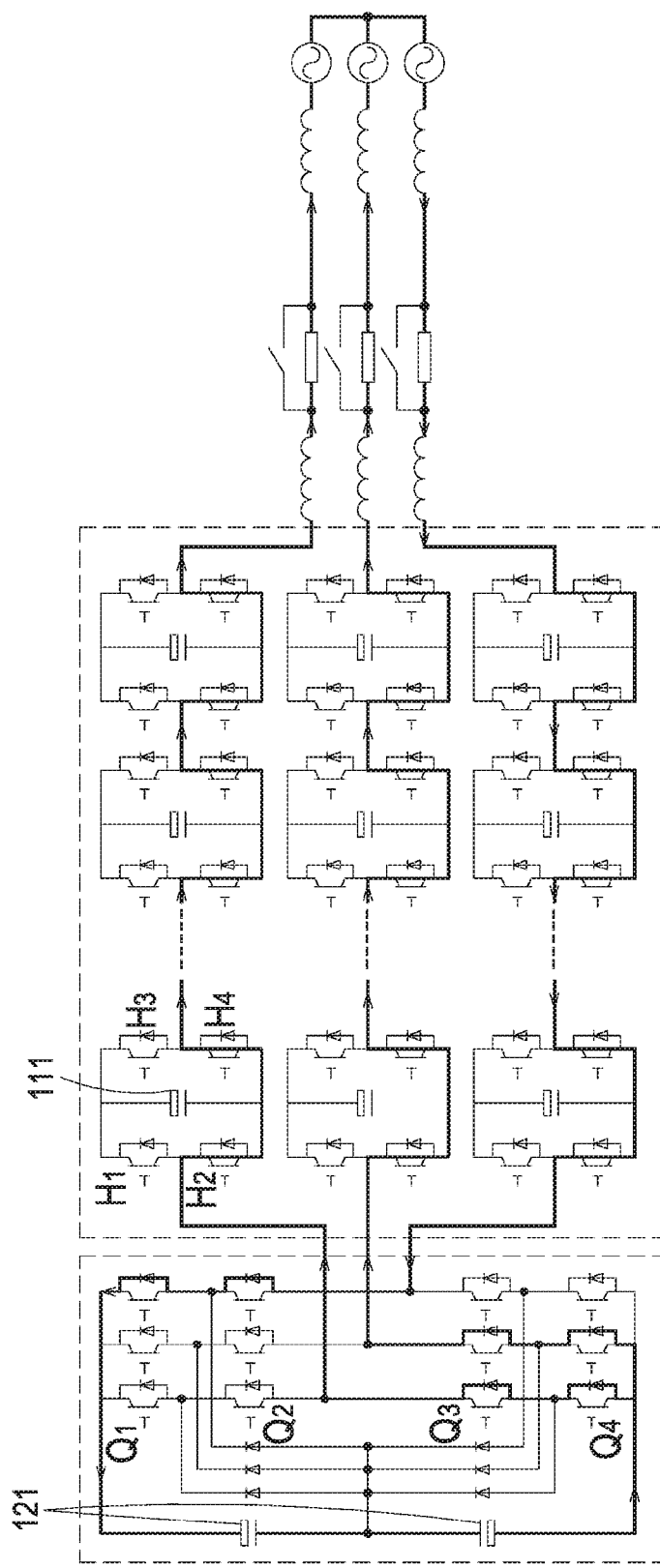

Please refer to the stage 3 of the FIG. 9, which is corresponding to the stage 3 of the FIGS. 8A and 8B. At the stage 3 of FIG. 9, the two-level first switch units Qa and the two-level second switch units Qb are turned off. Under this circumstance, the current flows through and charges the second capacitor unit 121. In addition, the first H-bridge switch units H1 and the third H-bridge switch units H3 are turned off, and the second H-bridge switch units H2 and the fourth H-bridge switch units H4 are turned on. Under this circumstance, the first capacitor unit 111 is bypassed, and the corresponding current simulation diagram is shown in FIG. 10C. Please refer to the stage 3 of FIG. 11, which is corresponding to the stage 3 of the FIGS. 8A and 8B. At the stage 3 of FIG. 11, the three-level first switch units Q1 to the three-level fourth switch units Q4 are turned off. Under this circumstance, the current flows through and charges the second capacitor unit 121. In addition, the first H-bridge switch units H1 and the third H-bridge switch units H3 are turned off, and the second H-bridge switch units H2 and the fourth H-bridge switch units H4 are turned on. Under this circumstance, the first capacitor unit 111 is bypassed, and the corresponding current simulation diagram is shown in FIG. 12C.

Please refer to the stage 4 of the FIG. 9, which is corresponding to the stage 4 of the FIGS. 8A and 8B. At the stage 4 of FIG. 9, the two-level first switch units Qa and the two-level second switch units Qb are turned off. In addition, the first H-bridge switch units H1 to the fourth H-bridge switch units H4 are turned off. When the voltages of the first capacitor unit 111 and the second capacitor unit 121 are slightly lower than that of the AC power 14, the current flows through and charges the first capacitor unit 111 and the second capacitor unit 121. The corresponding current simulation diagram is shown in FIG. 10D. Moreover, when the voltages of the first capacitor unit 111 and the second capacitor unit 121 are slightly higher than that of the AC power 14, the first capacitor unit 111 and the second capacitor unit 121 aren't charged by the current, and the voltages of the first capacitor unit 111 and the second capacitor unit 121 don't raise. Please refer to the stage 4 of the FIG. 11, which is corresponding to the stage 4 of the FIGS. 8A and 8B. At the stage 4 of FIG. 11, the three-level first switch units Q1 to the three-level fourth switch units Q4 are turned off. In addition, the first H-bridge switch units H1 to the fourth H-bridge switch units H4 are turned off. When the voltages of the first capacitor unit 111 and the second capacitor unit 121 are slightly lower than that of the AC power 14, the current flows through and charges the first capacitor unit 111 and the second capacitor unit 121. The corresponding current simulation diagram is shown in FIG. 12D. Moreover, when the voltages of the first capacitor unit 111 and the second capacitor unit 121 are slightly higher than that of the AC power 14, the first capacitor unit 111 and the second capacitor unit 121 aren't charged by the current, and the voltages of the first capacitor unit 111 and the second capacitor unit 121 don't raise.

Figure 13:
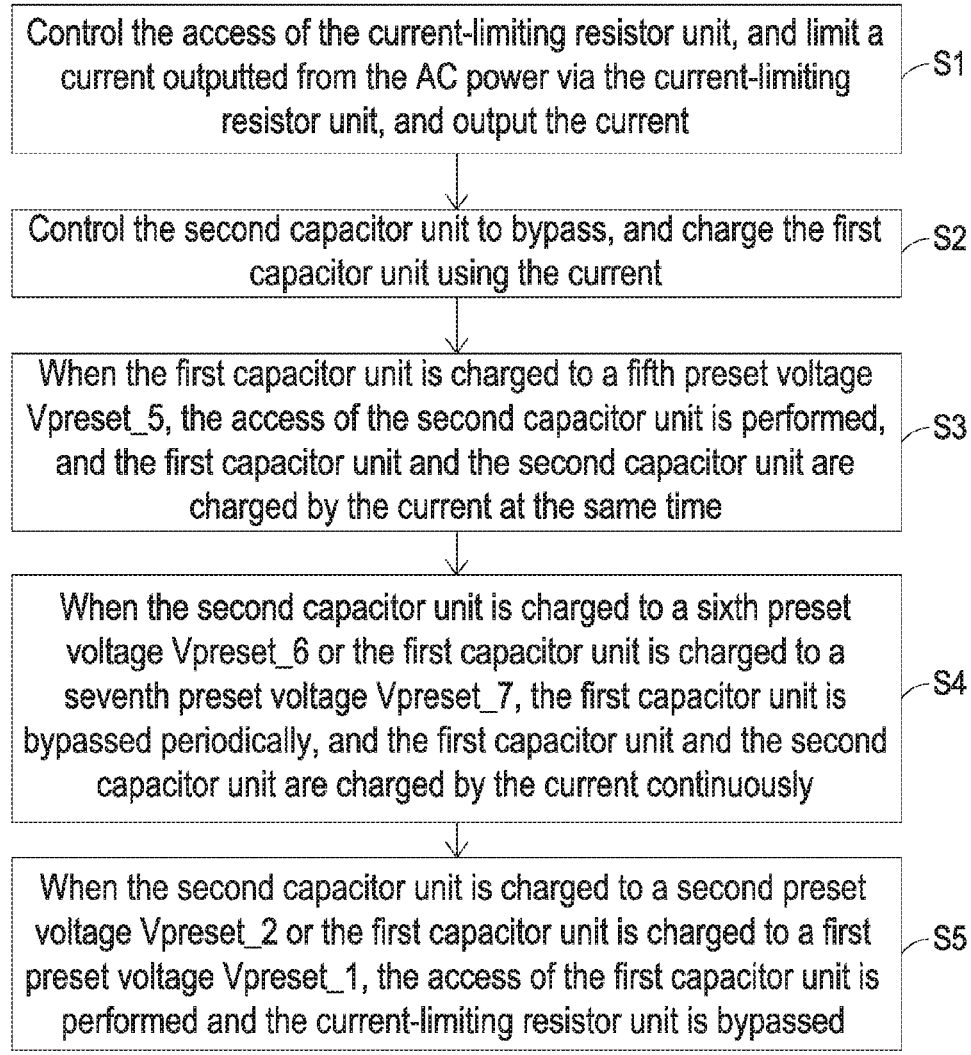
FIG. 13 shows a flowchart of pre-charge control method for the hybrid multilevel power converter according to a second embodiment of the present disclosure.

FIG. 13 shows a flowchart of pre-charge control method for the hybrid multilevel power converter according to a second embodiment of the present disclosure, and FIGS. 14A and 14B show sequence diagrams of pre-charging the first capacitor unit and the second capacitor unit according to the second embodiment of the present disclosure. As shown in FIGS. 1, 13, 14A and 14B, the pre-charge control method of the present disclosure comprises the following steps. Firstly, as shown in step S1, control the access of the current-limiting resistor unit 13, and limit a current outputted from the AC power 14 via the current-limiting resistor unit 13, and output the current. In an embodiment, in case that the current-limiting resistor unit 13a as shown in FIG. 4A is employed, the current-limiting method comprise step of: controlling the first switch 131a and the second switch 132a of each current-limiting circuit to turn on and turn off respectively, so that the access of the resistor unit 133a is performed and the current-limiting is performed by the resistor 133a. In another embodiment, in case that the current-limiting resistor unit 13b as shown in FIG. 4B is employed, the current-limiting method comprise step of: controlling the fourth switch 132b and the third switch 131b of each current-limiting circuit to turn on and turn off respectively, so that the access of the resistor unit 133b is performed and the current-limiting is performed by the resistor unit 133b.

Then, as shown in step S2, control the second capacitor unit 121 to bypass, and charge the first capacitor unit 111 using the current. In some embodiments, in case that the second converter 12 is a two-level inverter, the method of bypassing the second capacitor unit 121 comprises step of: controlling the two-level first switch units Qa of the three bridge legs of the second converter 12 to turn on at the same time, controlling the two-level second switch units Qb of the three bridge legs of the second converter 12 to turn on at the same time, or controlling the two-level first switch units Qa and the two-level second switch units Qb to alternately turn on so as to bypass the second capacitor unit 121. Consequently, the first capacitor unit 111 is charged by the current.

In some embodiments, in case that the second converter 12 is a three-level inverter, the method of bypassing the second capacitor unit 121 comprises the steps of: controlling the three-level first switch units Q1 of the second converter 12 and the three-level second switch units Q2 of the second converter 12 to turn on at the same time, controlling the three-level third switch units Q3 of the second converter 12 and the three-level fourth switch units Q4 of the second converter 12 to turn on at the same time, controlling the three-level second switch units Q2 of the second converter 12 and the three-level third switch units Q3 of the second converter 12 to turn on at the same time, or controlling at least two groups including the group of the three-level first switch units Q1 and the three-level second switch units Q2, the group of the three-level third switch units Q3 and the three-level fourth switch units Q4 and the group of the three-level second switch units Q2 and the three-level third switch units Q3 to alternately turn on so as to bypass the second capacitor unit 121. Consequently, the first capacitor unit 111 is charged by the current.

As shown in FIGS. 14A and 14B, the stage 1 is corresponding to the step S2 of the pre-charge control method. At the stage 1, the voltage of the first capacitor unit 111 raises continuously due to that the first capacitor unit 111 is charged by the current firstly (see FIG. 14A). In addition, the voltage of the second capacitor unit 121 doesn't change due to that the second capacitor unit 121 is bypassed (see FIG. 14B).

Then, as shown in step S3, when the first capacitor unit 111 is charged to a fifth preset voltage Vpreset_5, the access of the second capacitor unit 121 is performed and all switch units are turned off. Consequently, the first capacitor unit 111 and the second capacitor unit 121 are charged by the current at the same time. As shown in FIGS. 14A and 14B, the stage 2 is corresponding to the step S3 of the pre-charge control method. At the stage 2, the voltages of the first capacitor unit 111 and the second capacitor unit 121 raise due to that the current charges the first capacitor unit 111 and the second capacitor unit 121 at the same time (see FIGS. 14A and 14B).

Then, as shown in step S4, when the second capacitor unit 121 is charged to a sixth preset voltage Vpreset_6 or the first capacitor unit 111 is charged to a seventh preset voltage Vpreset_7, the first capacitor unit 111 is bypassed periodically, and the first capacitor unit 111 and the second capacitor unit 121 are charged by the current continuously. The method of bypassing the first capacitor unit 111 periodically includes the steps of: controlling the first H-bridge switch units H1 and the third H-bridge switch units H3 of the first converter 11 to turn on periodically at the same time, controlling the second H-bridge switch units H2 and the fourth H-bridge switch units H4 of the first converter 11 to turn on periodically at the same time, or controlling the group of the first H-bridge switch units H1 and the third H-bridge switch units H3 and the group of the second H-bridge switch units H2 and the fourth H-bridge switch units H4 to periodically and alternately turn on so as to bypass the first capacitor unit 111. As shown in FIGS. 14A and 14B, the stage 3 is corresponding to the step S4 of the pre-charge control method. At the stage 3, the voltages of the first capacitor unit 111 and the second capacitor unit 121 raise due to that the first capacitor unit 111 and the second capacitor unit 121 are charged by the current (see FIGS. 14A and 14B). However, the first capacitor unit 111 is periodically bypassed and periodically charged. In addition, the voltage of the first capacitor unit 111 has been raised to a relatively high level after stage 2. Consequently, the voltage of the first capacitor unit 111 raises to a lesser extent.

Finally, as shown in step S5, when the second capacitor unit 121 is charged to the second preset voltage Vpreset_2 or the first capacitor unit 111 is charged to the first preset voltage Vpreset_1, the access of the first capacitor unit 111 is performed and the current-limiting resistor unit 13 is bypassed. In an embodiment, when the current-limiting resistor unit 13a of FIG. 4A is employed, the method of controlling the current-limiting resistor unit 13a to bypass comprises the steps of: controlling the second switch 132a of each of the current-limiting circuits to turn on, and allowing the first switch 131a of each of the current-limiting circuits to turn on continuously so as to bypass the resistor unit 133a. In some embodiments, when the current-limiting resistor unit 13b of FIG. 4B is employed, the method of controlling the current-limiting resistor unit 13b to bypass comprises the steps of: controlling the third switch 131b of each of the current-limiting circuits to turn on so as to bypass the resistor unit 133b. As shown in FIGS. 14A and 14B, the stage 4 is corresponding to the step S5 of the pre-charge control method. At the stage 4, the first capacitor unit 111 and the second capacitor unit 121 aren't charged by the current when the voltages of the first capacitor unit 111 and the second capacitor unit 121 are slightly higher than that of the AC power 14. Consequently, the voltages of the first capacitor unit 111 and the second capacitor unit 121 doesn't raise. The first capacitor unit 111 and the second capacitor unit 121 are charged continuously by the current when the voltages of the first capacitor unit 111 and the second capacitor unit 121 are slightly lower than that of the AC power 14. Consequently, the voltages of the first capacitor unit 111 and the second capacitor unit 121 raise slightly.

Moreover, after the step S5, the pre-charge control method of the present disclosure further comprises the step S6 of performing the close-loop control, so that the first capacitor unit 111 is charged to a first rated voltage Vrat_1, and the second capacitor unit 121 is charged to a second rated voltage Vrat_2. In an embodiment, in case that the second converter 12 is the two-level inverter, the first capacitor unit 111 is charged to the first rated voltage Vrat_1 and the second capacitor unit 121 is charged to the second rated voltage Vrat_2 by controlling the first H-bridge switch units H1 to the fourth H-bridge switch units H4 of the first converter 11 and the two-level first switch units Qa to the two-level second switch units Qb of the second converter 12 to perform the close-loop control. In some embodiments, in case that the second converter 12 is the three-level inverter, the first capacitor unit 111 is charged to the first rated voltage Vrat_1 and the second capacitor unit 121 is charged to the second rated voltage Vrat_2 by controlling the first H-bridge switch units H1 to the fourth H-bridge switch units H4 of the first converter 11 and the three-level first switch units Q1 to the three-level fourth switch units Q4 of the second converter 12 to perform the close-loop control. As shown in FIGS. 14A and 14B, the stage 5 is corresponding to the step S6 of the pre-charge control method. At stage 5, the first capacitor unit 111 is charged to the first rated voltage Vrat_1 and the second capacitor unit 121 is charged to the second rated voltage Vrat_2 by performing the close-loop control.

Figure 15:
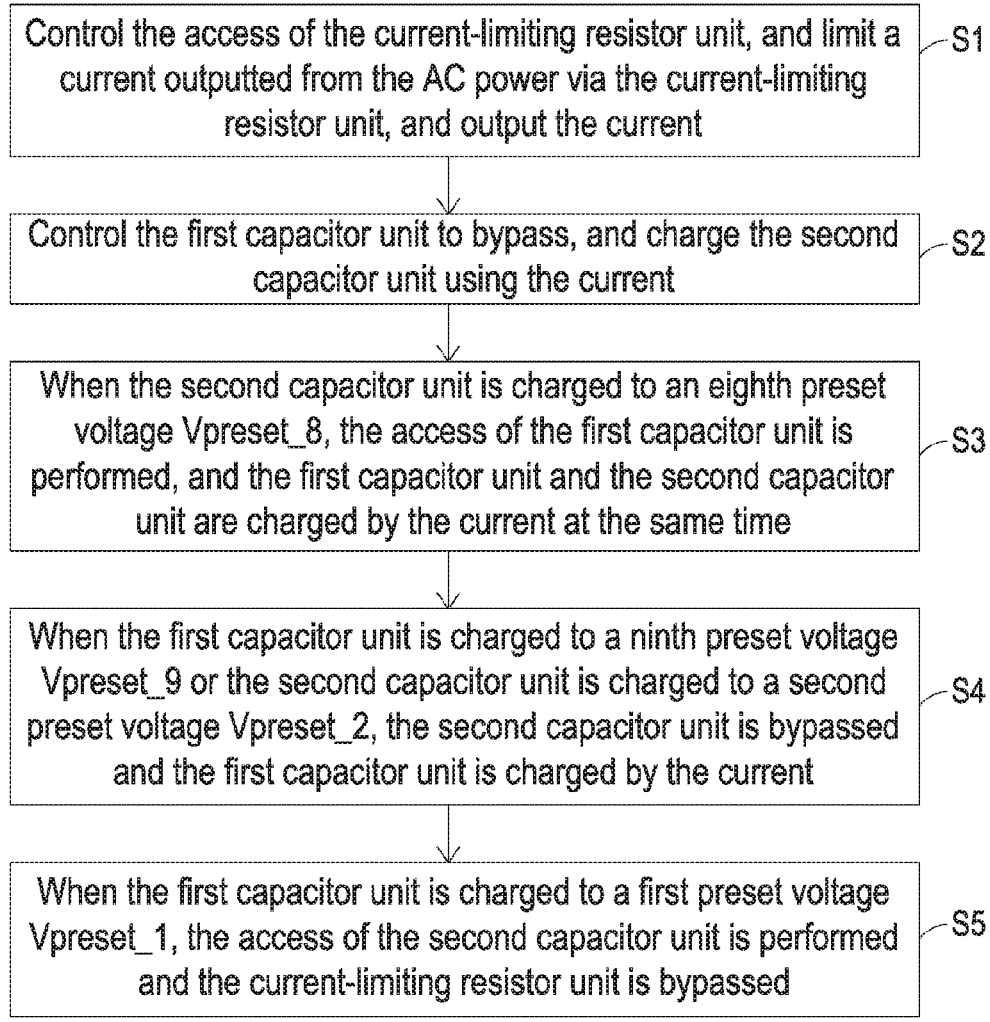
FIG. 15 shows a flowchart of pre-charge control method for the hybrid multilevel power converter according to a third embodiment of the present disclosure.

FIG. 15 shows a flowchart of pre-charge control method for the hybrid multilevel power converter according to a third embodiment of the present disclosure, and FIGS. 16A and 16B show sequence diagrams of pre-charging the first capacitor unit and the second capacitor unit according to the third embodiment of the present disclosure. As shown in FIGS. 1, 15, 16A and 16B, the pre-charge control method of the present disclosure comprises the following steps. Firstly, as shown in step S1, control the access of the current-limiting resistor unit 13, and limit a current outputted from the AC power 14 via the current-limiting resistor unit 13, and output the current. In an embodiment, in case that the current-limiting resistor unit 13a as shown in FIG. 4A is employed, the current-limiting method comprises step of: controlling the first switch 131a and the second switch 132a of each current-limiting circuit to turn on and turn off respectively, so that the access of the resistor unit 133a is performed and the current-limiting is performed by the resistor unit 133a. In another embodiment, in case that the current-limiting resistor unit 13b as shown in FIG. 4B is employed, the current-limiting method comprises step of: controlling the fourth switch 132b and the third switch 131b of each current-limiting circuit to turn on and turn off respectively, so that the access of the resistor unit 133b is performed and the current-limiting is performed by the resistor unit 133b.

Then, as shown in step S2, control the first capacitor unit 111 to bypass, and charge the second capacitor unit 121 using the current. The method of bypassing the first capacitor unit 111 comprises step of: controlling the first H-bridge switch units H1 and the third H-bridge switch units H3 of the first converter 11 to turn on at the same time, controlling the second H-bridge switch units H2 and the fourth H-bridge switch units H4 of the first converter 11 to turn on at the same time, or controlling the group of the first H-bridge switch units H1 and the third H-bridge switch units H3 of the first converter 11 and the group of the second H-bridge switch units H2 and the fourth H-bridge switch units H4 of the first converter 11 to alternately turn on so as to bypass the first capacitor unit 111. As shown in FIGS. 16A and 16B, the stage 1 is corresponding to the step S2 of the pre-charge control method. At the stage 1, the voltage of the second capacitor unit 121 raises continuously due to that the second capacitor unit 121 is charged by the current firstly and the first capacitor unit 111 is bypassed (see FIG. 16A). In addition, the voltage of the first capacitor unit 111 doesn't change (see FIG. 16B).

Then, as shown in step S3, when the second capacitor unit 121 is charged to an eighth preset voltage Vpreset_8, the access of the first capacitor unit 111 is performed. Under this circumstance, all switch units of the first converter 11 and the second converter 12 are turned off, and the first capacitor unit 111 and the second capacitor unit 121 are charged by the current at the same time. As shown in FIGS. 16A and 16B, the stage 2 is corresponding to the step S3 of the pre-charge control method. At the stage 2, the voltages of the first capacitor unit 111 and the second capacitor unit 121 raise due to that the current charges the first capacitor unit 111 and the second capacitor unit 121 at the same time (see FIGS. 16A and 16B).

Then, as shown in step S4, when the first capacitor unit 111 is charged to a ninth preset voltage Vpreset_9 or the second capacitor unit 121 is charged to the second preset voltage Vpreset_2, the second capacitor unit 121 is bypassed and the first capacitor unit 111 is charged by the current. In an embodiment, in case that the second converter is the two-level inverter, the method of bypassing the second capacitor unit 121 includes the steps of: controlling the two-level first switch units Qa of the three bridge legs of the second converter 12 to turn on at the same time, controlling the two-level second switch units Qb of the three bridge legs of the second converter 12 to turn on at the same time, or controlling the two-level first switch units Qa and the two-level second switch units Qb to alternately turn on so as to bypass the second capacitor unit 121. Consequently, the first capacitor unit 111 is charged by the current.

In another embodiment, in case that the second converter 12 is a three-level inverter, the method of bypassing the second capacitor unit 121 comprises the steps of: controlling the three-level first switch units Q1 of the second converter 12 and the three-level second switch units Q2 of the second converter 12 to turn on at the same time, controlling the three-level third switch units Q3 of the second converter 12 and the three-level fourth switch units Q4 of the second converter 12 to turn on at the same time, controlling the three-level second switch units Q2 of the second converter 12 and the three-level third switch units Q3 of the second converter 12 to turn on at the same time, or controlling at least two groups including the group of the three-level first switch units Q1 and the three-level second switch units Q2, the group of the three-level third switch units Q3 and the three-level fourth switch units Q4 and the group of the three-level second switch units Q2 and the three-level third switch units Q3 to alternately turn on so as to bypass the second capacitor unit 121. Consequently, the first capacitor unit 111 is charged by the current. As shown in FIGS. 16A and 16B, the stage 3 is corresponding to the step S4 of the pre-charge control method. At the stage 3, the voltage of the first capacitor unit 111 raises continuously due to that the first capacitor unit 111 is charged by the current (see FIG. 16A), and the voltage of the second capacitor unit 121 doesn't change due to that the second capacitor unit 121 is bypassed (see FIG. 16B).

Finally, as shown in step S5, when the first capacitor unit 111 is charged to the first preset voltage Vpreset_1, the access of the second capacitor unit 121 is performed and the current-limiting resistor unit 13 is bypassed. In an embodiment, when the current-limiting resistor unit 13a of FIG. 4A is employed, the method of controlling the current-limiting resistor unit 13a to bypass comprises the steps of: controlling the second switch 132a of each current-limiting circuit to turn on, and allowing the first switch 131*a* of each current-limiting circuit to turn on continuously so as to bypass the resistor unit 133*a*. In another embodiment, when the current-limiting resistor unit 13*b* of FIG. 4B is employed, the method of controlling the current-limiting resistor unit 13*b* to bypass comprises the steps of: controlling the third switch 131*b* of each current-limiting circuit to turn on so as to bypass the resistor unit 133*b*. As shown in FIGS. 16A and 16B, the stage 4 is corresponding to the step S5 of the pre-charge control method. At the stage 4, the first capacitor unit 111 and the second capacitor unit 121 aren't charged by the current when the voltages of the first capacitor unit 111 and the second capacitor unit 121 are slightly higher than that of the AC power 14. Consequently, the voltages of the first capacitor unit 111 and the second capacitor unit 121 doesn't raise. The first capacitor unit 111 and the second capacitor unit 121 are charged continuously by the current when the voltages of the first capacitor unit 111 and the second capacitor unit 121 are slightly lower than that of the AC power 14. Consequently, the voltages of the first capacitor unit 111 and the second capacitor unit 121 raise slightly.

Moreover, after the step S5, the pre-charge control method of the present disclosure further comprises the step S6 of performing the close-loop control, so that the first capacitor unit 111 is charged to the first rated voltage Vrat_1, and the second capacitor unit 121 is charged to the second rated voltage Vrat_2. In an embodiment, in case that the second converter 12 is the two-level inverter, the first capacitor unit 111 is charged to the first rated voltage Vrat_1 and the second capacitor unit 121 is charged to the second rated voltage Vrat_2 by controlling the first H-bridge switch units H1 to the fourth H-bridge switch units H4 of the first converter 11 and the two-level first switch units Qa to the two-level second switch units Qb of the second converter 12 to perform the close-loop control. In another embodiment, in case that the second converter 12 is the three-level inverter, the first capacitor unit 111 is charged to the first rated voltage Vrat_1 and the second capacitor unit 121 is charged to the second rated voltage Vrat_2 by controlling the first H-bridge switch units H1 to the fourth H-bridge switch units H4 of the first converter 11 and the three-level first switch units Q1 to the three-level fourth switch units Q4 of the second converter 12 to perform the close-loop control. As shown in FIGS. 16A and 16B, the stage 5 is corresponding to the step S6 of the pre-charge control method. At stage 5, the first capacitor unit 111 is charged to the first rated voltage Vrat_1 and the second capacitor unit 121 is charged to the second rated voltage Vrat_2 by performing the close-loop control.

Figure 17:
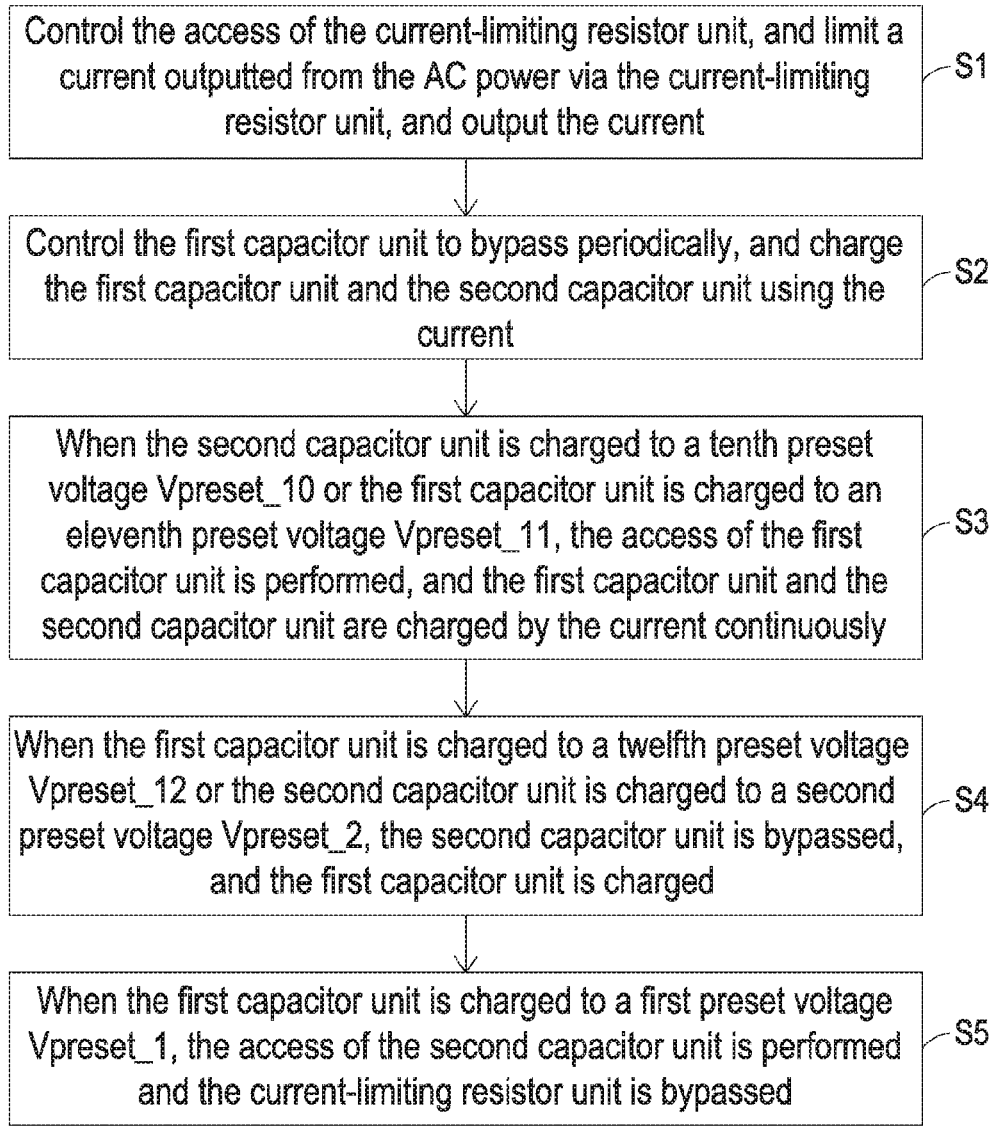
FIG. 17 shows a flowchart of pre-charge control method for the hybrid multilevel power converter according to a fourth embodiment of the present disclosure.
Figure 18A:
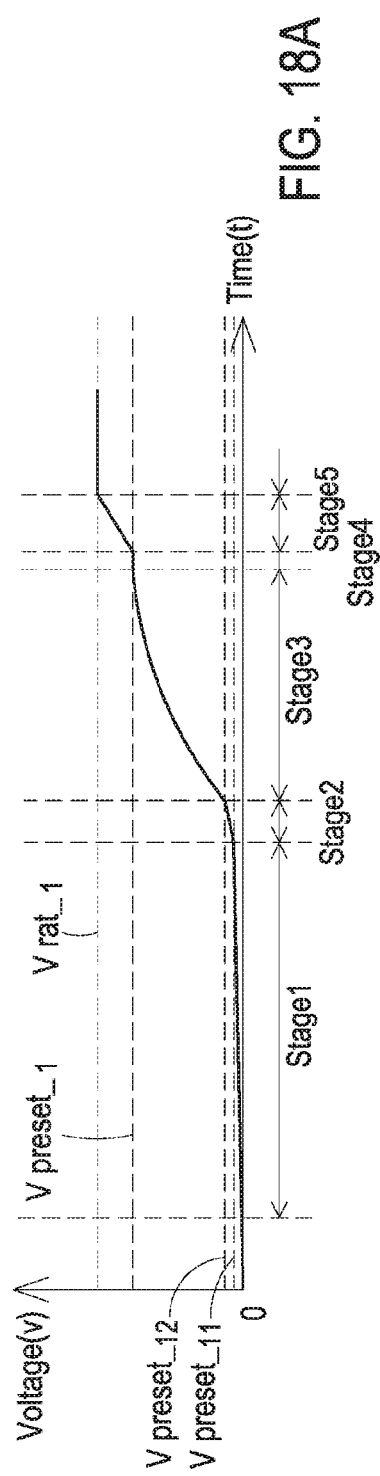
FIGS. 18A and 18B show sequence diagrams of pre-charging the first capacitor unit and the second capacitor unit according to a fourth embodiment of the present disclosure.
Figure 18B:
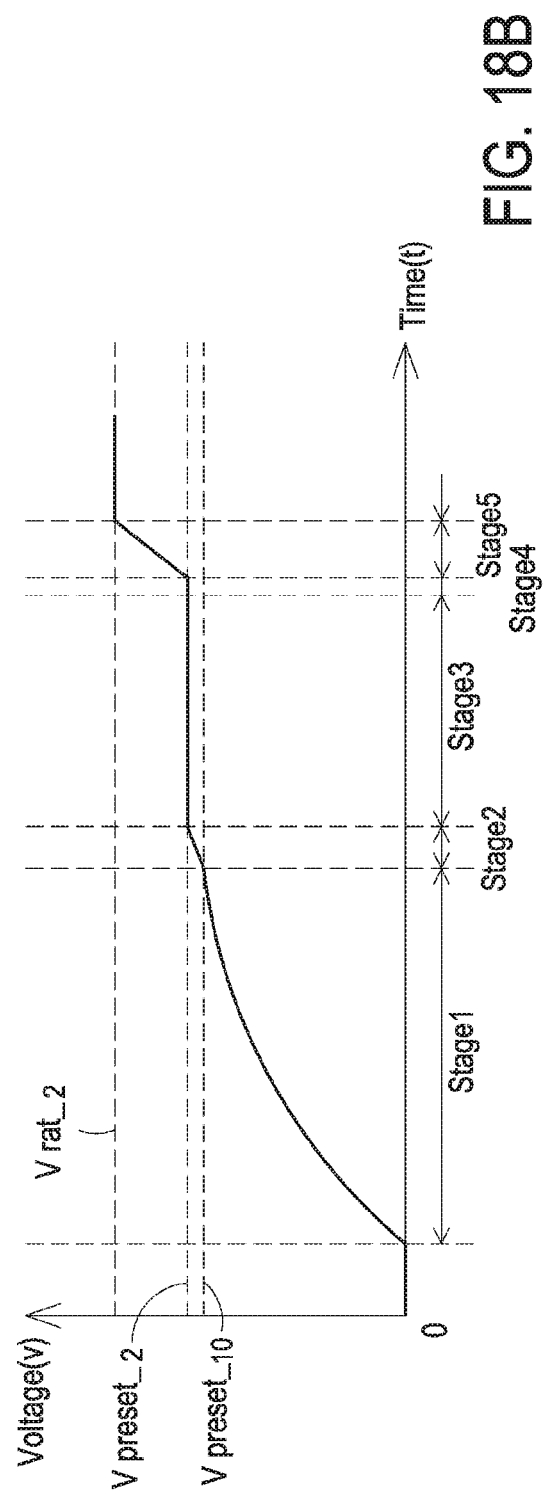

FIG. 17 shows a flowchart of pre-charge control method for the hybrid multilevel power converter according to a fourth embodiment of the present disclosure, and FIGS. 18A and 18B show sequence diagrams of pre-charging the first capacitor unit and the second capacitor unit according to the fourth embodiment of the present disclosure. As shown in FIGS. 1, 17, 18A and 18B, the pre-charge control method of the present disclosure comprises the following steps. Firstly, as shown in step S1, control the access of the current-limiting resistor unit 13, and limit a current outputted from the AC power 14 via the current-limiting resistor unit 13, and output the current. In an embodiment, in case that the current-limiting resistor unit 13*a* as shown in FIG. 4A is employed, the current-limiting method comprise step of: controlling the first switch 131*a* and the second switch 132*a* of each current-limiting circuit to turn on and turn off respectively, so that the access of the resistor unit 133*a* is performed and the current-limiting is performed by the resistor unit 133*a*. In another embodiment, in case that the current-limiting resistor unit 13*b* as shown in FIG. 4B is employed, the current-limiting method comprise step of: controlling the fourth switch 132*b* and the third switch 131*b* of each current-limiting circuit to turn on and turn off respectively, so that the access of the resistor unit 133*b* is performed and the current-limiting is performed by the resistor unit 133*b*.

Then, as shown in step S2, control the first capacitor unit 111 to bypass periodically, and charge the first capacitor unit 111 and the second capacitor unit 121 using the current. The method of bypassing the first capacitor unit 111 periodically comprises step of: controlling the first H-bridge switch units H1 and the third H-bridge switch units H3 of the first converter 11 to turn on periodically at the same time, controlling the second H-bridge switch units H2 and the fourth H-bridge switch units H4 of the first converter 11 to turn on periodically at the same time, or controlling the group of the first H-bridge switch units H1 and the third H-bridge switch units H3 of the first converter 11 and the group of the second H-bridge switch units H2 and the fourth H-bridge switch units H4 of the first converter 11 to periodically and alternately turn on so as to bypass the first capacitor unit 111 periodically. As shown in FIGS. 18A and 18B, the stage 1 is corresponding to the step S2 of the pre-charge control method. At the stage 1, the voltages of the first capacitor unit 111 and the second capacitor unit 121 raise due to that the first capacitor unit 111 and the second capacitor unit 121 are charged by the current firstly (see FIGS. 18A and 18B). However, the first capacitor unit 111 is periodically bypassed and periodically charged. In addition, the capacitance level of the first capacitor unit 111 is larger than that of the second capacitor unit 121. Consequently, the voltage of the first capacitor unit 111 raises to a lesser extent.

Then, as shown in step S3, when the second capacitor unit 121 is charged to a tenth preset voltage Vpreset_10 or the first capacitor unit 111 is charged to an eleventh preset voltage Vpreset_11, the access of the first capacitor unit 111 is performed for allowing the current to charge the first capacitor unit 111 and the second capacitor unit 121 continuously. As shown in FIGS. 18A and 18B, the stage 2 is corresponding to the step S3 of the pre-charge control method. At the stage 2, the voltages of the first capacitor unit 111 and the second capacitor unit 121 raise due to that the current charges the first capacitor unit 111 and the second capacitor unit 121 at the same time (see FIGS. 18A and 18B).

Then, as shown in step S4, when the first capacitor unit 111 is charged to a twelfth preset voltage Vpreset_12 or the second capacitor unit 121 is charged to a second preset voltage Vpreset_2, the second capacitor unit 121 is bypassed, and the first capacitor unit 111 is charged. In an embodiment, in case that the second converter 12 is the two-level inverter, the method of bypassing the second capacitor unit 121 includes the steps of: controlling the two-level first switch units Qa of the three bridge legs of the second converter 12 to turn on at the same time, controlling the two-level second switch units Qb of the three bridge legs of the second converter 12 to turn on at the same time, or controlling the two-level first switch units Qa and the two-level second switch units Qb to alternately turn on so as to bypass the second capacitor unit 121. Consequently, the first capacitor unit 111 is charged by the current. In some embodiments, in case that the second converter 12 is the three-level inverter, the method of bypassing the second capacitor unit 121 comprises the steps of: controlling the three-level first switch units Q1 of the second converter 12 and the three-level second switch units Q2 of the second converter 12 to turn on at the same time, controlling the three-level third switch units Q3 of the second converter 12 and the three-level fourth switch units Q4 of the second converter 12 to turn on at the same time, controlling the three-level second switch units Q2 of the second converter 12 and the three-level third switch units Q3 of the second converter 12 to turn on at the same time, or controlling at least two groups including the group of the three-level first switch units Q1 and the three-level second switch units Q2, the group of the three-level third switch units Q3 and the three-level fourth switch units Q4 and the group of the three-level second switch units Q2 and the three-level third switch units Q3 to alternately turn on so as to bypass the second capacitor unit 121. Consequently, the first capacitor unit 111 is charged by the current. As shown in FIGS. 18A and 18B, the stage 3 is corresponding to the step S4 of the pre-charge control method. At the stage 3, the voltage of the first capacitor unit 111 raises continuously due to that the first capacitor unit 111 is charged by the current firstly (see FIG. 18A). In addition, the voltage of the second capacitor unit 121 doesn't change due to that the second capacitor unit 121 is bypassed (see FIG. 18B).

Finally, as shown in step S5, when the first capacitor unit 111 is charged to the first preset voltage Vpreset_1, the access of the second capacitor unit 121 is performed and the current-limiting resistor unit 13 is bypassed. In an embodiment, when the current-limiting resistor unit 13a of FIG. 4A is employed, the method of controlling the current-limiting resistor unit 13a to bypass comprises the steps of: controlling the second switch 132a of each of the current-limiting circuits to turn on, and allowing the first switch 131a of each current-limiting circuit to turn on continuously so as to bypass the resistor unit 133a. In some embodiments, when the current-limiting resistor unit 13b of FIG. 4B is employed, the method of controlling the current-limiting resistor unit 13b to bypass comprises the steps of: controlling the third switch 131b of each current-limiting circuit to turn on so as to bypass the resistor unit 133b. As shown in FIGS. 18A and 18B, the stage 4 is corresponding to the step S5 of the pre-charge control method. At the stage 4, the first capacitor unit 111 and the second capacitor unit 121 aren't charged by the current when the voltages of the first capacitor unit 111 and the second capacitor unit 121 are slightly higher than that of the AC power 14. Consequently, the voltages of the first capacitor unit 111 and the second capacitor unit 121 doesn't raise. The first capacitor unit 111 and the second capacitor unit 121 are charged continuously by the current when the voltages of the first capacitor unit 111 and the second capacitor unit 121 are slightly lower than that of the AC power 14. Consequently, the voltages of the first capacitor unit 111 and the second capacitor unit 121 raise slightly.

Moreover, after the step S5, the pre-charge control method of the present disclosure further comprises the step S6 of performing the close-loop control, so that the first capacitor unit 111 is charged to the first rated voltage Vrat_1, and the second capacitor unit 121 is charged to the second rated voltage Vrat_2. In an embodiment, in case that the second converter 12 is the two-level inverter, the first capacitor unit 111 is charged to the first rated voltage Vrat_1 and the second capacitor unit 121 is charged to the second rated voltage Vrat_2 by controlling the first H-bridge switch units H1 to the fourth H-bridge switch units H4 of the first converter 11 and the two-level first switch units Qa to the two-level second switch units Qb of the second converter 12 to perform the close-loop control. In some embodiments, in case that the second converter 12 is the three-level inverter, the first capacitor unit 111 is charged to the first rated voltage Vrat_1 and the second capacitor unit 121 is charged to the second rated voltage Vrat_2 by controlling the first H-bridge switch units H1 to the fourth H-bridge switch units H4 of the first converter 11 and the three-level first switch units Q1 to the three-level fourth switch units Q4 of the second converter 12 to perform the close-loop control. As shown in FIGS. 18A and 18B, the stage 5 is corresponding to the step S6 of the pre-charge control method. At stage 5, the first capacitor unit 111 is charged to the first rated voltage Vrat_1 and the second capacitor unit 121 is charged to the second rated voltage Vrat_2 by performing the close-loop control.

Figure 19:
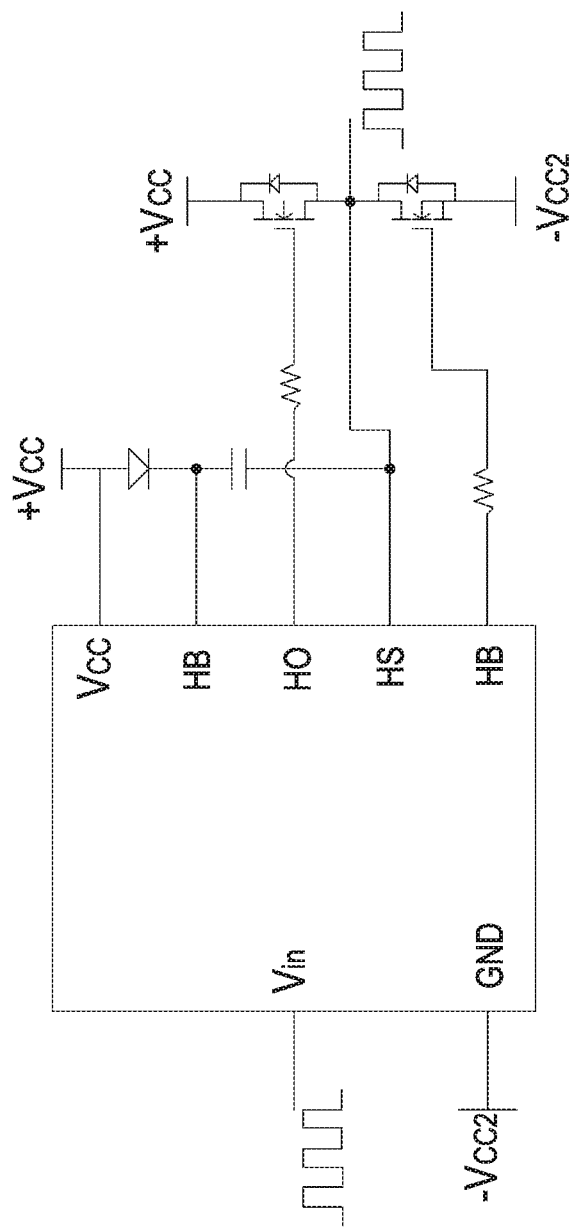
FIG. 19 is a circuit view illustrating the driving circuit with the bootstrapped capacitor.
Figure 20:
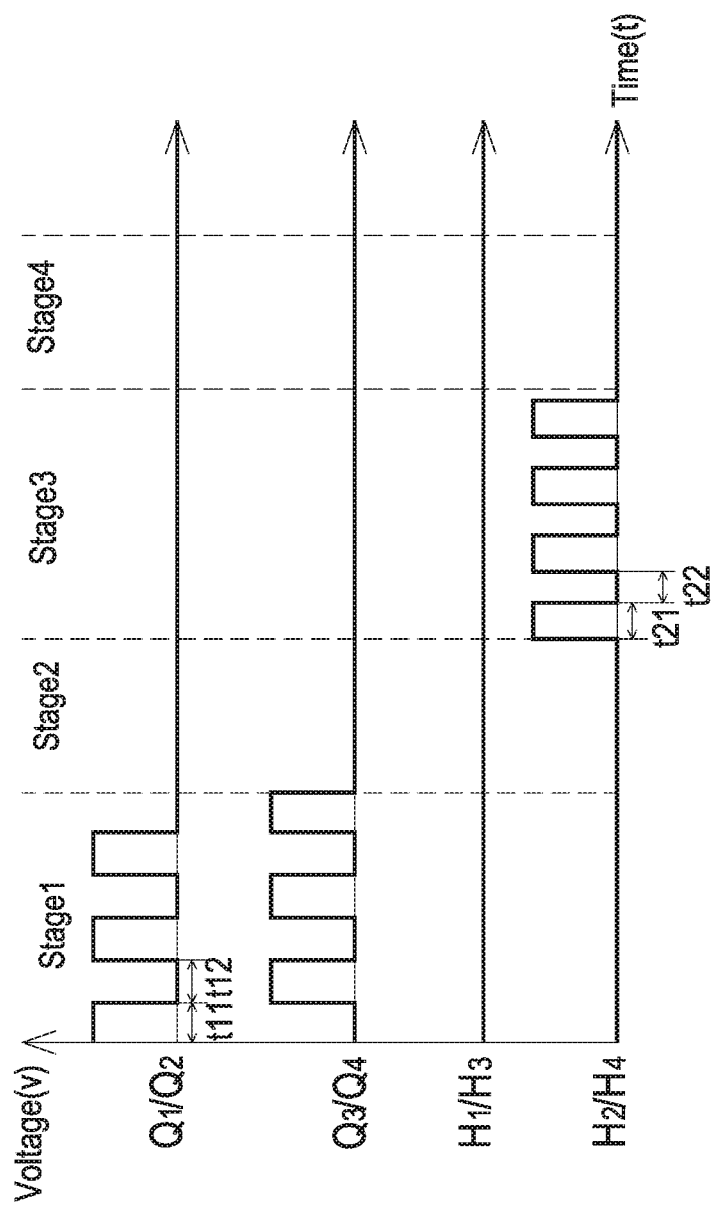
FIG. 20 is another exemplary sequence diagram of switch signal of the hybrid multilevel power converter of the present disclosure.

FIG. 19 is a circuit diagram illustrating the driving circuit with the bootstrapped capacitor, and FIG. 20 is another exemplary sequence diagram of switch signal of the hybrid multilevel power converter of the present disclosure, where the second converter is a three-level inverter, and the switch of the driving circuit with the bootstrapped capacitor would not be turned on for a long time. In some embodiments, as shown in FIGS. 19 and 20, the hybrid multilevel power converter 1 of the present disclosure further comprises the driving circuit 19 of the first converter 11 and the driving circuit 19 of the second converter 12 for controlling the H-bridge switch units of the first converter 11 and the switch units of the second converter 12 to turn on or turn off. In this embodiment, preferably but not exclusively, the driving circuit 19 of the second converter 12 (for example the three-level inverter) is a driving circuit with the bootstrapped capacitor. The driving circuit 19 of the second converter 12 is configured to control the three-level first switch units Q1, the three-level second switch units Q2, the three-level third switch units Q3 and the three-level fourth switch units Q4 to alternately turn on and turn off so as to control the second capacitor unit 121 to bypass (see the switch signals of Q1/Q2 and Q3/Q4 in FIG. 20). Moreover, the period of turning on the switch unit is t11, and the period of turning off the switch unit is t12. Consequently, the second capacitor unit 121 is bypassed. In this embodiment, preferably but not exclusively, the driving circuit 19 of the first converter 11 is a driving circuit with the bootstrapped capacitor. The driving circuit 19 of the first converter 11 is configured to control the second H-bridge switch units H2 and the fourth H-bridge switch units H4 to turn on and turn off periodically so as to control the first capacitor unit 111 to bypass periodically (see the switch signals of H2/H4 in FIG. 20). Moreover, the period of turning on the switch unit is t21, and the period of turning off the switch unit is t22. Moreover, the time periods of t11, t12, t21 and t22 are not limited and can be adjusted according to the practical requirements.

From the above first to fourth embodiments, preferably but not exclusively, the ratio of the first preset voltage Vpreset_1 to the first rated voltage Vrat_1 is maintained at a constant value. Preferably, the ratio of the first preset voltage Vpreset_1 to the first rated voltage Vrat_1 is ranged from 0.5 to 0.9. The ratio of the second preset voltage Vpreset_2 to the second rated voltage Vrat_2 is maintained at a constant value. Preferably, the ratio of the second preset voltage Vpreset_2 to the second rated voltage Vrat_2 is ranged from 0.5 to 0.9. More preferably, the ratio of the first preset voltage Vpreset_1 to the first rated voltage Vrat_1 is equal to the ratio of the second preset voltage Vpreset_2 to the second rated voltage Vrat_2. Consequently, the over-modulation of the close-loop control can be avoided.

In conclusion, the present disclosure provides a pre-charge control method for a hybrid multilevel power converter. The DC bus voltages of the second capacitor unit of the two-level/three-level inverter and the first capacitor unit of the H-bridge circuit are well controlled after the pre-charge control method is performed, and the close-loop control of the hybrid multilevel power converter is easy to be achieved. Moreover, it needn't to add pre-charge devices to connect with respective DC bus capacitors for performing the pre-charge process.

While the disclosure has been described in terms of what are presently considered to be the most practical and preferred embodiments, it is to be understood that the disclosure need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the disclosure which is defined by the appended claims.

What is claimed is:

1. A pre-charge control method for a hybrid multilevel power converter, wherein the hybrid multilevel power converter comprises a first converter, a second converter and a current-limiting resistor unit, the first converter comprises three H-bridge modules, each of the three H-bridge modules comprises at least one H-bridge circuit, each the H-bridge circuit comprises a first capacitor unit, and the second converter comprises a second capacitor unit, wherein the three H-bridge modules are electrically connected with the second converter, and the three H-bridge modules are connected with the AC power by the current-limiting resistor unit, the pre-charge control method comprising steps of:
   (a) controlling the access of the current-limiting resistor unit, and limiting a current outputted from the AC power via the current-limiting resistor unit, and outputting the current;
   (b) controlling the second capacitor unit to bypass, and charging the first capacitor unit using the current;
   (c) controlling the access of the second capacitor unit when the first capacitor unit is charged to a third preset voltage, and allowing the current to charge the first capacitor unit and the second capacitor unit at the same time;
   (d) controlling the first capacitor unit to bypass when the second capacitor unit is charged to a fourth preset voltage or the first capacitor unit is charged to a first preset voltage, and charging the second capacitor unit using the current; and
   (e) controlling the access of the first capacitor unit and the current-limiting resistor unit to bypass when the second capacitor unit is charged to a second preset voltage.

2. The pre-charge control method according to claim 1, wherein the current-limiting resistor unit includes three current-limiting circuits, and each of three current-limiting circuits comprises a first switch, a second switch and a resistor unit, wherein the second switch is connected in parallel with the resistor unit to form a parallel branch, and the parallel branch is connected in series with the first switch;
   wherein the step (a) further comprises the step of: controlling the first switch of each of three current-limiting circuits to turn on and the second switch of each of three current-limiting circuits to turn off respectively for performing the access of the resistor unit of each of three current-limiting circuits, and limiting the current via the resistor unit of each of three current-limiting circuits,
   wherein the step (e) further comprises step of: controlling the second switch of each of three current-limiting circuits to turn on for bypassing the resistor unit of each of three current-limiting circuits.

3. The pre-charge control method according to claim 1, wherein the current-limiting resistor unit includes three current-limiting circuits, and each of three current-limiting circuits comprises a third switch, a fourth switch and a resistor unit, and the fourth switch is connected in series with the resistor unit to form a series branch, and the series branch is connected in parallel with the third switch;
   wherein the step (a) further comprises step of: controlling the fourth switch of each of three current-limiting circuits to turn on and the third switch of each of three current-limiting circuits to turn off respectively for performing the access of the resistor unit of each of three current-limiting circuits, and limiting the current via the resistor unit of each of three current-limiting circuits,
   wherein the step (e) further comprises step of: controlling the third switch of each of three current-limiting circuits to turn on for bypassing the resistor unit of each of three current-limiting circuits.

4. The pre-charge control method according to claim 1, wherein the second converter is a two-level inverter, and comprises three bridge legs which are electrically connected in parallel with the second capacitor unit, each of three bridge legs comprises an upper leg including a two-level first switch unit and a lower leg including a two-level second switch unit, wherein each of the H-bridge circuits comprises two bridge legs, the two bridge legs are connected in parallel with the first capacitor unit, each of the two bridge legs comprises an upper leg and a lower leg, wherein one upper leg includes a first H-bridge switch unit and the other upper leg includes a third H-bridge switch unit; and one lower leg includes a second H-bridge switch unit and the other lower leg includes a fourth H-bridge switch unit;
   wherein the step (b) further comprises step of: controlling the two-level first switch units of the second converter to turn on, controlling the two-level second switch units of the second converter to turn on, or controlling the two-level first switch units and the two-level second switch units of the second converter to alternately turn on so as to bypass the second capacitor unit, wherein the step (d) further comprises step of: controlling the first H-bridge switch units and the third H-bridge switch units of the first converter to turn on, controlling the second H-bridge switch units and the fourth H-bridge switch units of the first converter to turn on, or controlling the group of the first H-bridge switch units and the third H-bridge switch units of the first converter and the group of the second H-bridge switch units and the fourth H-bridge switch units of the first converter to alternately turn on for bypassing the first capacitor unit.

5. The pre-charge control method according to claim 4, further comprising the step of:
   (f) performing the close-loop control to control the two-level first switch units and the two-level second switch units of the second converter, and the first H-bridge switch units, the second H-bridge switch units, the third H-bridge switch units and the fourth H-bridge switch units of the first converter for charging the first capacitor unit to a first rated voltage and charging the second capacitor unit to a second rated voltage.

6. The pre-charge control method according to claim 5, wherein the ratio of the first preset voltage to the first rated voltage is ranged from 0.5 to 0.9, and the ratio of the second preset voltage to the second rated voltage is ranged from 0.5 to 0.9.

7. The pre-charge control method according to claim 5, wherein the ratio of the first preset voltage to the first rated voltage is equal to the ratio of the second preset voltage to the second rated voltage.

8. The pre-charge control method according to claim 1, wherein the second converter is a three-level inverter, and comprises three bridge legs which are electrically connected in parallel with the second capacitor unit, each of three bridge legs comprises an upper leg including a three-level first switch unit and a three-level second switch unit and a lower leg including a three-level third switch unit and a three-level fourth switch unit, wherein each of the H-bridge circuits comprises two bridge legs, the two bridge legs are connected in parallel with the first capacitor unit, each of the two bridge legs comprises an upper leg and a lower leg, wherein one upper leg includes a first H-bridge switch unit and the other upper leg includes a third H-bridge switch unit; and one lower leg includes a second H-bridge switch unit and the other lower leg includes a fourth H-bridge switch unit,
wherein the step (b) further comprises step of: controlling the three-level first switch units and the three-level second switch units of the second converter to turn on, controlling the three-level third switch units and the three-level fourth switch units of the second converter to turn on, controlling the three-level second switch units and the three-level third switch units of the second converter to turn on, or controlling at least two groups including the group of the three-level first switch units and the three-level second switch units of the second converter, the group of the three-level third switch units and the three-level fourth switch units of the second converter and the group of the three-level second switch units and the three-level third switch units of the second converter to alternately turn on so as to bypass the second capacitor unit, wherein the step (d) further comprises step of: controlling the first H-bridge switch units and the third H-bridge switch units of the first converter to turn on, controlling the second H-bridge switch units and the fourth H-bridge switch units of the first converter to turn on, or controlling the group of the first H-bridge switch units and the third H-bridge switch units of the first converter and the group of the second H-bridge switch units and the fourth H-bridge switch units of the first converter to alternately turn on for bypassing the first capacitor unit.

9. The pre-charge control method according to claim 8, further comprising the step of:
(f) performing the close-loop control to control the three-level first switch units, the three-level second switch units, the three-level third switch units and the three-level fourth switch units of the second converter, and the first H-bridge switch units, the second H-bridge switch units, the third H-bridge switch units and the fourth H-bridge switch units of the first converter for charging the first capacitor unit to a first rated voltage and charging the second capacitor unit to a second rated voltage.

10. The pre-charge control method according to claim 9, wherein the ratio of the first preset voltage to the first rated voltage is ranged from 0.5 to 0.9, and the ratio of the second preset voltage to the second rated voltage is ranged from 0.5 to 0.9.

11. The pre-charge control method according to claim 9, wherein the ratio of the first preset voltage to the first rated voltage is equal to the ratio of the second preset voltage to the second rated voltage.

12. A pre-charge control method for a hybrid multilevel power converter, wherein the hybrid multilevel power converter comprises a first converter, a second converter and a current-limiting resistor unit, the first converter comprises three H-bridge modules, each of the three H-bridge modules comprises at least one H-bridge circuit, each H-bridge circuit comprises a first capacitor unit, and the second converter comprises a second capacitor unit, wherein the three H-bridge modules are electrically connected with the second converter, and the three H-bridge modules are connected with the AC power by the current-limiting resistor unit, the pre-charge control method comprising steps of:
(a) controlling the access of the current-limiting resistor unit, and limiting a current outputted from the AC power via the current-limiting resistor unit, and outputting the current;
(b) controlling the second capacitor unit to bypass, and charging the first capacitor unit using the current;
(c) controlling the access of the second capacitor unit when the first capacitor unit is charged to a fifth preset voltage, and allowing the current to charge the first capacitor unit and the second capacitor unit at the same time;
(d) controlling the first capacitor unit to bypass periodically when the second capacitor unit is charged to a sixth preset voltage or the first capacitor unit is charged to a seventh preset voltage, and allowing the current to charge the first capacitor unit and the second capacitor unit; and
(e) controlling the access of the first capacitor unit and the current-limiting resistor unit to bypass when the second capacitor unit is charged to a second preset voltage or the first capacitor unit is charged to a first preset voltage.

13. The pre-charge control method according to claim 12, wherein the second converter is a two-level inverter, and comprises three bridge legs which are electrically connected in parallel with the second capacitor unit, each of three bridge legs comprises an upper leg including a two-level first switch unit and a lower leg including a two-level second switch unit, wherein each of the H-bridge circuits comprises two bridge legs, the two bridge legs are connected in parallel with the first capacitor unit, each of the two bridge legs comprises an upper leg and a lower leg, wherein one upper leg includes a first H-bridge switch unit and the other upper leg includes a third H-bridge switch unit; and one lower leg includes a second H-bridge switch unit and the other lower leg includes a fourth H-bridge switch unit;
wherein the step (b) further comprises step of: controlling the two-level first switch units of the second converter to turn on, controlling the two-level second switch units of the second converter to turn on, or controlling the two-level first switch units and the two-level second switch units of the second converter to alternately turn on so as to bypass the second capacitor unit, wherein the step (d) further comprises step of: controlling the first H-bridge switch units and the third H-bridge switch units of the first converter to turn on periodically, controlling the second H-bridge switch units and the fourth H-bridge switch units of the first converter to turn on periodically, or controlling the group of the first H-bridge switch units and the third H-bridge switch units of the first converter and the group of the second H-bridge switch units and the fourth H-bridge switch units of the first converter to periodically and alternately turn on for bypassing the first capacitor unit.

14. The pre-charge control method according to claim 13, further comprising the step of:
(f) performing the close-loop control to control the two-level first switch units and the two-level second switch units of the second converter, and the first H-bridge switch units, the second H-bridge switch units, the third H-bridge switch units and the fourth H-bridge switch units of the first converter for charging the first capacitor unit to a first rated voltage and charging the second capacitor unit to a second rated voltage.

15. The pre-charge control method according to claim 12, wherein the second converter is a three-level inverter, and comprises three bridge legs which are electrically connected in parallel with the second capacitor unit, each of the three bridge legs comprises an upper leg including a three-level first switch unit and a three-level second switch unit and a lower leg including a three-level third switch unit and a three-level fourth switch unit, wherein each of the H-bridge circuits comprises two bridge legs, the two bridge legs are connected in parallel with the first capacitor unit, each of the two bridge legs comprises an upper leg and a lower leg, wherein one upper leg includes a first H-bridge switch unit and the other upper leg includes a third H-bridge switch unit; and one lower leg includes a second H-bridge switch unit and the other lower leg includes a fourth H-bridge switch unit;
wherein the step (b) further comprises step of: controlling the three-level first switch units and the three-level second switch units of the second converter to turn on, controlling the three-level third switch units and the three-level fourth switch units of the second converter to turn on, controlling the three-level second switch units and the three-level third switch units of the second converter to turn on, or controlling at least two groups including the group of the three-level first switch units and the three-level second switch units of the second converter, the group of the three-level third switch units and the three-level fourth switch units of the second converter and the group of the three-level second switch units and the three-level third switch units of the second converter to alternately turn on so as to bypass the second capacitor unit, wherein the step (d) further comprises step of: controlling the first H-bridge switch units and the third H-bridge switch units of the first converter to turn on periodically, controlling the second H-bridge switch units and the fourth H-bridge switch units of the first converter to turn on periodically, or controlling the group of the first H-bridge switch units and the third H-bridge switch units of the first converter and the group of the second H-bridge switch units and the fourth H-bridge switch units of the first converter to periodically and alternately turn on for bypassing the first capacitor unit.

16. The pre-charge control method according to claim 15, further comprising the step of:
(f) performing the close-loop control to control the three-level first switch units, the three-level second switch units, the three-level third switch units and the three-level fourth switch units of the second converter, and the first H-bridge switch units, the second H-bridge switch units, the third H-bridge switch units and the fourth H-bridge switch units of the first converter for charging the first capacitor unit to a first rated voltage and charging the second capacitor unit to a second rated voltage.

17. A pre-charge control method for a hybrid multilevel power converter, wherein the hybrid multilevel power converter comprises a first converter, a second converter and a current-limiting resistor unit, the first converter comprises three H-bridge modules, each of the three H-bridge modules comprises at least one H-bridge circuit, each H-bridge circuit comprises a first capacitor unit, and the second converter comprises a second capacitor unit, wherein the three H-bridge modules are electrically connected with the second converter, and the three H-bridge modules are connected with the AC power by the current-limiting resistor unit, the pre-charge control method comprising steps of:
(a) controlling the access of the current-limiting resistor unit, and limiting a current outputted from the AC power via the current-limiting resistor unit, and outputting the current;
(b) controlling the first capacitor unit to bypass, and charging the second capacitor unit using the current;
(c) controlling the access of the first capacitor unit when the second capacitor unit is charged to an eighth preset voltage, and allowing the current to charge the first capacitor unit and the second capacitor unit at the same time;
(d) controlling the second capacitor unit to bypass when the first capacitor unit is charged to a ninth preset voltage or the second capacitor unit is charged to a second preset voltage, and charging the first capacitor unit using the current; and
(e) controlling the access of the second capacitor unit and the current-limiting resistor unit to bypass when the first capacitor unit is charged to a first preset voltage.

18. The pre-charge control method according to claim 17, wherein the second converter is a two-level inverter, and comprises three bridge legs which are electrically connected in parallel with the second capacitor unit, each of three bridge legs comprises an upper leg including a two-level first switch unit and a lower leg including a two-level second switch unit, wherein each of the H-bridge circuits comprises two bridge legs, the two bridge legs are connected in parallel with the first capacitor unit, each of the two bridge legs comprises an upper leg and a lower leg, wherein one upper leg includes a first H-bridge switch unit and the other upper leg includes a third H-bridge switch unit; and one lower leg includes a second H-bridge switch unit and the other lower leg includes a fourth H-bridge switch unit;
wherein the step (b) further comprises step of: controlling the first H-bridge switch units and the third H-bridge switch units of the first converter to turn on, controlling the second H-bridge switch units and the fourth H-bridge switch units of the first converter to turn on, or controlling the group of the first H-bridge switch units and the third H-bridge switch units of the first converter and the group of the second H-bridge switch units and the fourth H-bridge switch units of the first converter to alternately turn on for bypassing the first capacitor unit, wherein the step (d) further comprises step of: controlling the two-level first switch units of the second converter to turn on, controlling the two-level second switch units of the second converter to turn on, or controlling the two-level first switch units of the second converter and the two-level second switch units of the second converter to alternately turn on so as to bypass the second capacitor unit.

19. The pre-charge control method according to claim 18, further comprising the step of:
(f) performing the close-loop control to control the two-level first switch units and the two-level second switch units of the second converter, and the first H-bridge switch units, the second H-bridge switch units, the third H-bridge switch units and the fourth H-bridge switch units of the first converter for charging the first capacitor unit to a first rated voltage and charging the second capacitor unit to a second rated voltage.

20. The pre-charge control method according to claim 18, wherein the second converter is a three-level inverter, and comprises three bridge legs which are electrically connected in parallel with the second capacitor unit, each of the three bridge legs comprises an upper leg including a three-level first switch unit and a three-level second switch unit and a lower leg including a three-level third switch unit and a three-level fourth switch unit, wherein each of the H-bridge circuits comprises two bridge legs, the two bridge legs are connected in parallel with the first capacitor unit, each of the two bridge legs comprises an upper leg and a lower leg, wherein one upper leg includes a first H-bridge switch unit and the other upper leg includes a third H-bridge switch unit; and one lower leg includes a second H-bridge switch unit and the other lower leg includes a fourth H-bridge switch unit;
wherein the step (b) further comprises step of: controlling the first H-bridge switch units and the third H-bridge switch units of the first converter to turn on, controlling the second H-bridge switch units and the fourth H-bridge switch units of the first converter to turn on, or controlling the group of the first H-bridge switch units and the third H-bridge switch units of the first converter and the group of the second H-bridge switch units and the fourth H-bridge switch units of the first converter to alternately turn on for bypassing the first capacitor unit, wherein the step (d) further comprises step of: controlling the three-level first switch units and the three-level second switch units of the second converter to turn on, controlling the three-level third switch units and the three-level fourth switch units of the second converter to turn on, controlling the three-level second switch units and the three-level third switch units of the second converter to turn on, or controlling at least two groups including the group of the three-level first switch units and the three-level second switch units of the second converter, the group of the three-level third switch units and the three-level fourth switch units of the second converter and the group of the three-level second switch units and the three-level third switch units of the second converter to alternately turn on so as to bypass the second capacitor unit.

21. The pre-charge control method according to claim 20, further comprising the step of:
(f) performing the close-loop control to control the three-level first switch units, the three-level second switch units, the three-level third switch units and the three-level fourth switch units of the second converter, and the first H-bridge switch units, the second H-bridge switch units, the third H-bridge switch units and the fourth H-bridge switch units of the first converter for charging the first capacitor unit to a first rated voltage and charging the second capacitor unit to a second rated voltage.

22. A pre-charge control method for a hybrid multilevel power converter, wherein the hybrid multilevel power converter comprises a first converter, a second converter and a current-limiting resistor unit, the first converter comprises three H-bridge modules, each of the three H-bridge modules comprises at least one H-bridge circuit, each H-bridge circuit comprises a first capacitor unit, and the second converter comprises a second capacitor unit, wherein the three H-bridge modules are electrically connected with the second converter, and the three H-bridge modules are connected with the AC power by the current-limiting resistor unit, the pre-charge control method comprising steps of:
(a) controlling the access of the current-limiting resistor unit, and limiting a current outputted from the AC power via the current-limiting resistor unit, and outputting the current;
(b) controlling the first capacitor unit to bypass periodically, and charging the first capacitor unit and the second capacitor unit using the current;
(c) controlling the access of the first capacitor unit when the second capacitor unit is charged to a tenth preset voltage or the first capacitor unit is charged to an eleventh preset voltage, and allowing the current to charge the first capacitor unit and the second capacitor unit;
(d) controlling the second capacitor unit to bypass and charging the first capacitor unit using current when the first capacitor unit is charged to a twelfth preset voltage or the second capacitor unit is charged to a second preset voltage; and
(e) controlling the access of the second capacitor unit and the current-limiting resistor unit to bypass when the first capacitor unit is charged to a first preset voltage.

23. The pre-charge control method according to claim 22, wherein the second converter is a two-level inverter, and comprises three bridge legs which are electrically connected in parallel with the second capacitor unit, each of three bridge legs comprises an upper leg including a two-level first switch unit and a lower leg including a two-level second switch unit, wherein each of the H-bridge circuits comprises two bridge legs, the two bridge legs are connected in parallel with the first capacitor unit, each of the two bridge legs comprises an upper leg and a lower leg, wherein one upper leg includes a first H-bridge switch unit and the other upper leg includes a third H-bridge switch unit; and one lower leg includes a second H-bridge switch unit and the other lower leg includes a fourth H-bridge switch unit;
wherein the step (b) further comprises step of: controlling the first H-bridge switch units and the third H-bridge switch units of the first converter to turn on periodically, controlling the second H-bridge switch units and the fourth H-bridge switch units of the first converter to turn on periodically, or controlling the group of the first H-bridge switch units and the third H-bridge switch units of the first converter and the group of the second H-bridge switch units and the fourth H-bridge switch units of the first converter to periodically and alternately turn on for bypassing the first capacitor unit, wherein the step (d) further comprises step of: controlling the two-level first switch units of the second converter to turn on, controlling the two-level second switch units of the second converter to turn on, or controlling the two-level first switch units and the two-level second switch units of the second converter to alternately turn on so as to bypass the second capacitor unit.

24. The pre-charge control method according to claim 23, further comprising the step of:
(f) performing the close-loop control to control the two-level first switch units and the two-level second switch units of the second converter, and the first H-bridge switch units, the second H-bridge switch units, the third H-bridge switch units and the fourth H-bridge switch units of the first converter for charging the first capacitor unit to a first rated voltage and charging the second capacitor unit to a second rated voltage.

25. The pre-charge control method according to claim 22, wherein the second converter is a three-level inverter, and comprises three bridge legs which are electrically connected in parallel with the second capacitor unit, each of the three bridge legs comprises an upper leg including a three-level first switch unit and a three-level second switch unit and a lower leg including a three-level third switch unit and a three-level fourth switch unit, wherein each of the H-bridge circuits comprises two bridge legs, the two bridge legs are connected in parallel with the first capacitor unit, each of the two bridges comprises an upper leg and a lower leg, wherein one upper leg includes a first H-bridge switch unit and the other upper leg includes a third H-bridge switch unit; and one lower leg includes a second H-bridge switch unit and the other lower leg includes a fourth H-bridge switch unit;

wherein the step (b) further comprises step of: controlling the first H-bridge switch units and the third H-bridge switch units of the first converter to turn on periodically, controlling the second H-bridge switch units and the fourth H-bridge switch units of the first converter to turn on periodically, or controlling the group of the first H-bridge switch units and the third H-bridge switch units of the first converter and the group of the second H-bridge switch units and the fourth H-bridge switch units of the first converter to periodically and alternately turn on for bypassing the first capacitor unit, wherein the step (d) further comprises step of: controlling the three-level first switch units and the three-level second switch units of the second converter to turn on, controlling the three-level third switch units and the three-level fourth switch units of the second converter to turn on, controlling the three-level second switch units and the three-level third switch units of the second converter to turn on, or controlling at least two groups including the group of the three-level first switch units and the three-level second switch units of the second converter, the group of the three-level third switch units and the three-level fourth switch units of the second converter and the group of the three-level second switch units and the three-level third switch units of the second converter to alternately turn on so as to bypass the second capacitor unit.

26. The pre-charge control method according to claim 25, further comprising the step of:
(f) performing the close-loop control to control the three-level first switch units, the three-level second switch units, the three-level third switch units and the three-level fourth switch units of the second converter, and the first H-bridge switch units, the second H-bridge switch units, the third H-bridge switch units and the fourth H-bridge switch units of the first converter for charging the first capacitor unit to a first rated voltage and charging the second capacitor unit to a second rated voltage.

* * * * *